(12) United States Patent
Miyano

(10) Patent No.: US 7,916,399 B2
(45) Date of Patent: Mar. 29, 2011

(54) ZOOM LENS AND IMAGING APPARATUS

(75) Inventor: Hitoshi Miyano, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/614,777

(22) Filed: Nov. 9, 2009

(65) Prior Publication Data

US 2010/0123957 A1      May 20, 2010

(30) Foreign Application Priority Data

Nov. 19, 2008   (JP) ................. P2008-295424

(51) Int. Cl.
*G02B 15/14* (2006.01)

(52) U.S. Cl. ...................................... 359/688

(58) Field of Classification Search ............... 359/676, 359/688, 684, 695, 715

See application file for complete search history.

(56) References Cited

U.S. PATENT DOCUMENTS

| | | | |
|---|---|---|---|
| 7,139,131 B2 | 11/2006 | Nanba et al. | |
| 7,292,398 B1 | 11/2007 | Misaka | |
| 7,304,805 B2 | 12/2007 | Endo et al. | |

FOREIGN PATENT DOCUMENTS

| | | | |
|---|---|---|---|
| JP | 2005-345892 A | 12/2005 | |
| JP | 2006-78964 A | 3/2006 | |
| JP | 2006-349947 A | 12/2006 | |
| JP | 2007-163964 A | 6/2007 | |

*Primary Examiner* — Alicia M Harrington
(74) *Attorney, Agent, or Firm* — Birch, Stewart, Kolasch & Birch, LLP

(57) ABSTRACT

A first lens group having positive refractive power, a second lens group having negative refractive power, a third lens group having the negative refractive power, and a fourth lens group having the positive refractive power are included in order from an object side, and variation of magnification from a wide-angle end to a telephoto end is performed by monotonically moving the second lens group toward an image side and compensation of a fluctuation of an image surface resulting from the variation of magnification is performed by moving the third lens group. At least one positive lens having an optical material satisfying a conditional expressions is included in at least one of the first lens group G1 and the fourth lens group.

9 Claims, 23 Drawing Sheets

EXAMPLE 1
WIDE-ANGLE END

TELEPHOTO END

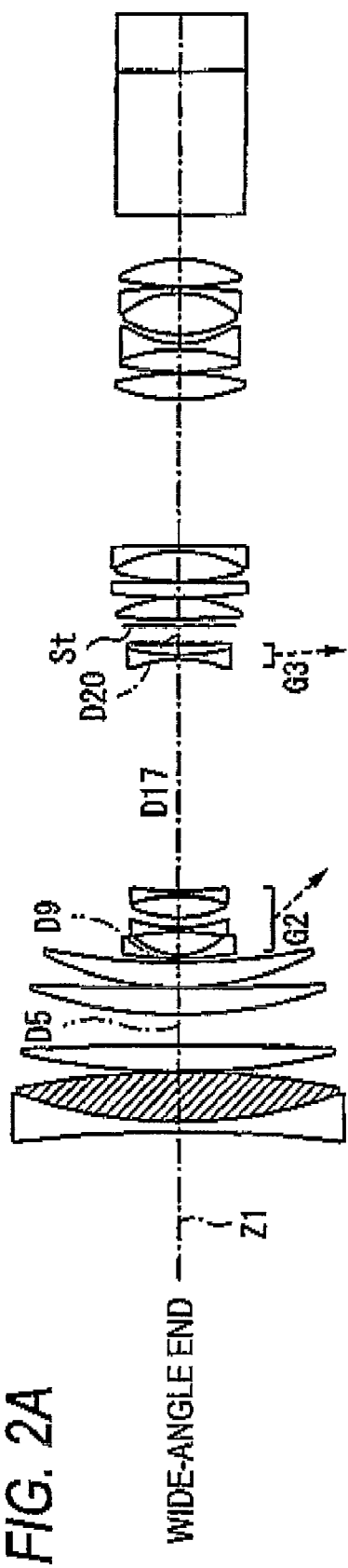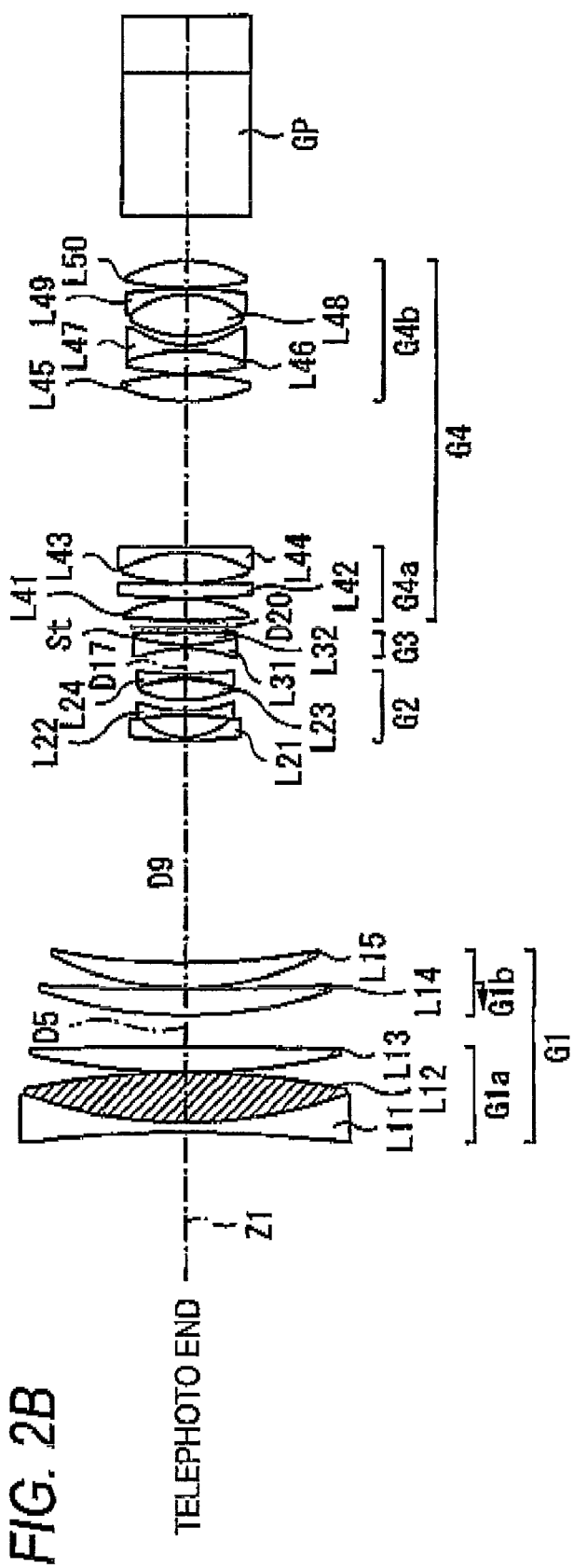
FIG. 2A WIDE-ANGLE END
FIG. 2B TELEPHOTO END

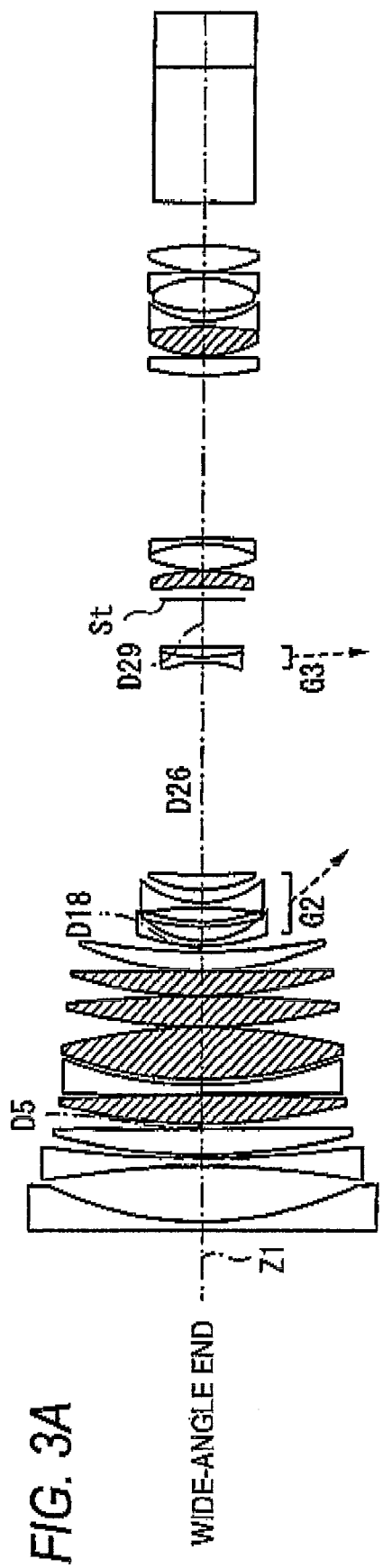
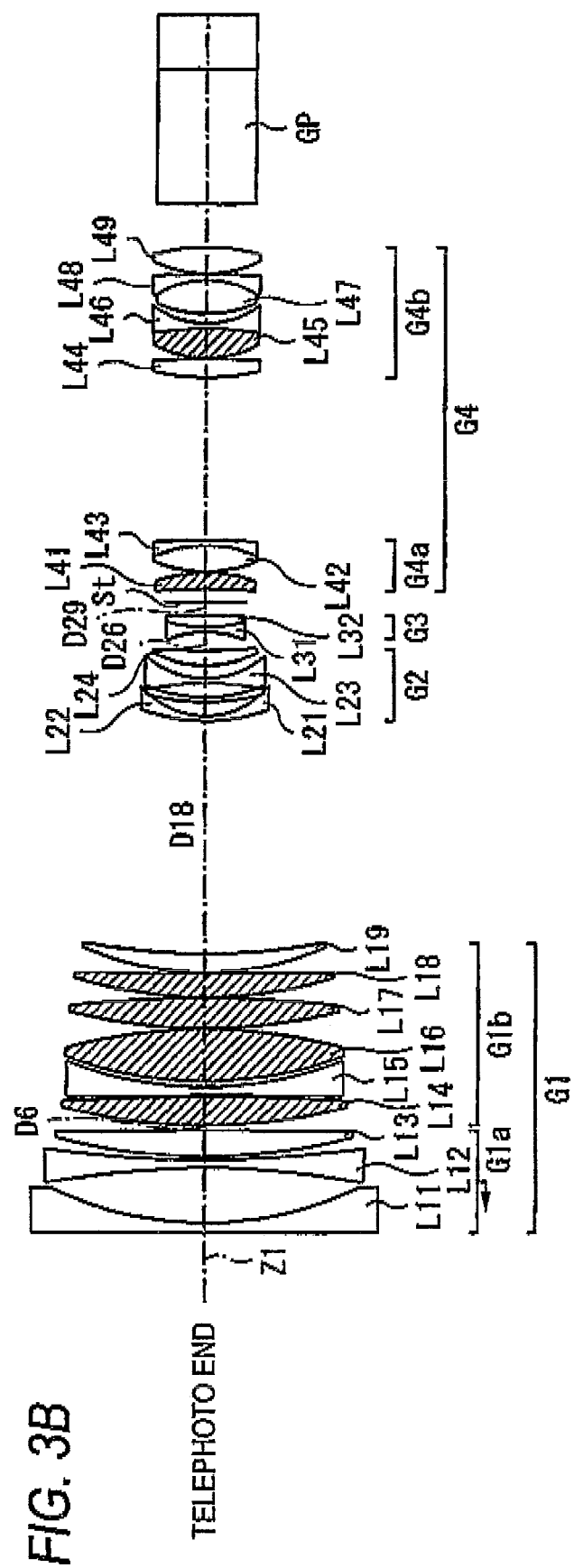
FIG. 3A EXAMPLE 3 WIDE-ANGLE END
FIG. 3B TELEPHOTO END

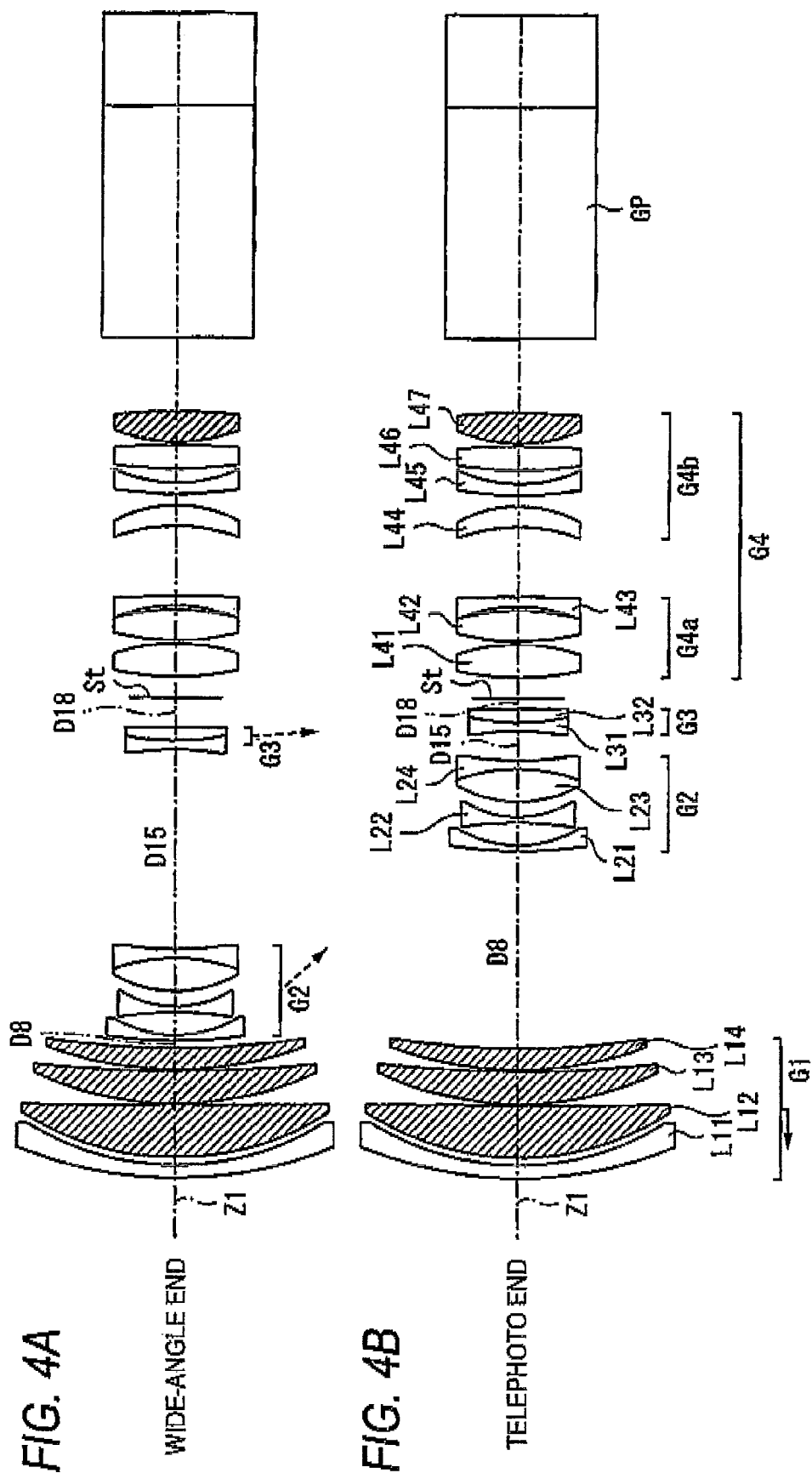
FIG. 4A EXAMPLE 4 WIDE-ANGLE END
FIG. 4B TELEPHOTO END

FIG. 8

| | EXAMPLE 1 · BASIC LENS DATA | | | | | | |
|---|---|---|---|---|---|---|---|
| | SURFACE NO. | Ri | Di | Ndj | νdj | | θCA' | θCt |
| G1 / G1a | 1 | -174.263 | 2.60 | 1.80518 | 25.4 | | 0.305 | 0.668 |
| | 2 | 213.2726 | 6.14 | | | | | |
| | 3 | ∞ | 8.49 | 1.43387 | 95.2 | * | 0.345 | 0.798 |
| | 4 | -128.229 | 0.12 | | | | | |
| | 5 | 295.175 | 8.20 | 1.43387 | 95.2 | * | 0.345 | 0.798 |
| | 6 | -220.169 | 7.78 (VARIABLE) | | | | | |
| G1b | 7 | 128.7211 | 9.86 | 1.56908 | 71.3 | * | 0.340 | 0.787 |
| | 8 | -314.378 | 0.12 | | | | | |
| | 9 | 66.8913 | 6.44 | 1.81600 | 46.6 | | 0.335 | 0.769 |
| | 10 | 135.8946 | 0.00 | | | | | |
| | 11 | ∞ | 0.98 (VARIABLE) | | | | | |
| G2 | 12 | 56.5508 | 0.80 | 1.83400 | 37.2 | | 0.325 | 0.732 |
| | 13 | 14.7151 | 7.11 | | | | | |
| | 14 | -64.2344 | 0.80 | 1.83481 | 42.7 | | 0.332 | 0.759 |
| | 15 | 42.402 | 1.42 | | | | | |
| | 16 | 26.5973 | 4.91 | 1.84666 | 23.9 | | 0.302 | 0.650 |
| | 17 | -51.0338 | 0.69 | | | | | |
| | 18 | -33.3981 | 0.80 | 1.77250 | 49.6 | | 0.341 | 0.796 |
| | 19 | 82.6008 | 57.30 (VARIABLE) | | | | | |
| G3 | 20 | -28.3334 | 0.80 | 1.75500 | 52.3 | | 0.345 | 0.811 |
| | 21 | 43.207 | 2.48 | 1.84666 | 23.9 | | 0.302 | 0.650 |
| | 22 | ∞ | 6.76 (VARIABLE) | | | | | |
| | 23 | (DIAPHRAGM) | 1.98 | | | | | |
| G4 / G4a | 24 | 176.5204 | 5.05 | 1.55671 | 58.5 | | 0.343 | 0.768 |
| | 25 | -38.7828 | 0.12 | | | | | |
| | 26 | 159.31 | 3.39 | 1.58913 | 61.2 | | 0.351 | 0.837 |
| | 27 | -2167.1 | 0.12 | | | | | |
| | 28 | 58.0145 | 7.09 | 1.51824 | 59.0 | | 0.348 | 0.819 |
| | 29 | -36.77 | 1.25 | 1.80400 | 46.6 | | 0.337 | 0.779 |
| | 30 | -513.007 | 34.64 | | | | | |
| G4b | 31 | 69.702 | 4.64 | 1.51680 | 64.2 | | 0.359 | 0.868 |
| | 32 | -69.702 | 0.12 | | | | | |
| | 33 | 31.1108 | 7.42 | 1.48749 | 70.4 | | 0.364 | 0.899 |
| | 34 | -39.89 | 1.30 | 1.83481 | 42.7 | | 0.332 | 0.759 |
| | 35 | 21.9777 | 3.56 | | | | | |
| | 36 | 32.0908 | 8.23 | 1.51680 | 64.2 | | 0.359 | 0.868 |
| | 37 | -23.595 | 1.25 | 1.83481 | 42.7 | | 0.332 | 0.759 |
| | 38 | -108.999 | 0.12 | | | | | |
| | 39 | 93.9695 | 6.73 | 1.48749 | 70.4 | | 0.364 | 0.899 |
| | 40 | -26.4429 | 10.53 | | | | | |
| | 41 | ∞ | 33.00 | 1.58267 | 46.5 | | 0.331 | 0.772 |
| | 42 | ∞ | 13.20 | 1.51633 | 64.1 | | 0.357 | 0.867 |
| | 43 | ∞ | | | | | | |

(*: MATERIAL SATISFYING CONDITION OF ANOMALOUS DISPERSION CHARACTERISTIC)

FIG. 9

| | SURFACE NO. | Ri | Di | Ndj | νdj | | θCA' | θCt |
|---|---|---|---|---|---|---|---|---|
| EXAMPLE 2 · BASIC LENS DATA ||||||||
| G1 / G1a | 1 | -333.03 | 2.40 | 1.80518 | 25.4 | | 0.305 | 0.668 |
| | 2 | 114.17 | 11.45 | 1.49700 | 81.5 | * | 0.350 | 0.826 |
| | 3 | -200.031 | 0.12 | | | | | |
| | 4 | 169.1432 | 6.04 | 1.48749 | 70.2 | | 0.363 | 0.892 |
| | 5 | -900.354 | 7.20 (VARIABLE) | | | | | |
| G1b | 6 | 107.31 | 6.15 | 1.63854 | 55.4 | | 0.342 | 0.797 |
| | 7 | 726.6232 | 0.12 | | | | | |
| | 8 | 68.6486 | 5.85 | 1.79952 | 42.2 | | 0.331 | 0.754 |
| | 9 | 166.7602 | 0.92 (VARIABLE) | | | | | |
| G2 | 10 | 79.506 | 0.82 | 1.83400 | 37.2 | | 0.325 | 0.732 |
| | 11 | 14.8477 | 5.37 | | | | | |
| | 12 | -54.4744 | 0.82 | 1.78800 | 47.4 | | 0.338 | 0.784 |
| | 13 | 31.1425 | 2.46 | | | | | |
| | 14 | 26.0996 | 4.94 | 1.84666 | 23.8 | | 0.304 | 0.661 |
| | 15 | -34.8286 | 0.39 | | | | | |
| | 16 | -28.1156 | 0.82 | 1.83481 | 42.7 | | 0.332 | 0.759 |
| | 17 | 79.3145 | 54.24 (VARIABLE) | | | | | |
| G3 | 18 | -29.1483 | 0.82 | 1.78800 | 47.4 | | 0.338 | 0.784 |
| | 19 | 44.223 | 2.86 | 1.84666 | 23.8 | | 0.304 | 0.661 |
| | 20 | -356.936 | 4.00 (VARIABLE) | | | | | |
| | 21 | (DIAPHRAGM) | 1.61 | | | | | |
| G4 / G4a | 22 | 217.8665 | 5.00 | 1.58267 | 46.5 | | 0.331 | 0.772 |
| | 23 | -31.6637 | 0.12 | | | | | |
| | 24 | 166.92 | 3.40 | 1.58913 | 61.2 | | 0.351 | 0.837 |
| | 25 | -851.16 | 0.12 | | | | | |
| | 26 | 49.3953 | 7.10 | 1.48749 | 70.2 | | 0.363 | 0.892 |
| | 27 | -30.778 | 1.25 | 1.83400 | 37.2 | | 0.325 | 0.732 |
| | 28 | -548.294 | 34.00 | | | | | |
| G4b | 29 | 41.2274 | 6.10 | 1.51742 | 52.2 | | 0.342 | 0.799 |
| | 30 | -55.1035 | 0.12 | | | | | |
| | 31 | 57.7229 | 5.40 | 1.48749 | 70.2 | | 0.363 | 0.892 |
| | 32 | -38.155 | 1.30 | 1.83481 | 42.7 | | 0.332 | 0.759 |
| | 33 | 20.9716 | 2.16 | | | | | |
| | 34 | 27.0435 | 9.60 | 1.51824 | 59.0 | | 0.348 | 0.819 |
| | 35 | -20.71 | 1.25 | 1.83481 | 42.7 | | 0.332 | 0.759 |
| | 36 | -95.5901 | 0.20 | | | | | |
| | 37 | 62.3218 | 6.27 | 1.48749 | 70.2 | | 0.363 | 0.892 |
| | 38 | -28.434 | 10.49 | | | | | |
| | 39 | ∞ | 33.00 | 1.58267 | 46.5 | | 0.331 | 0.772 |
| | 40 | ∞ | 13.20 | 1.51633 | 64.1 | | 0.357 | 0.867 |
| | 41 | ∞ | | | | | | |

(*: MATERIAL SATISFYING CONDITION OF ANOMALOUS DISPERSION CHARACTERISTIC)

FIG. 10

| | | EXAMPLE 3 · BASIC LENS DATA | | | | | |
|---|---|---|---|---|---|---|---|
| | SURFACE NO. | Ri | Di | Ndj | νdj | | θCA' | θCt |

| Group | Surface No. | Ri | Di | Ndj | νdj | * | θCA' | θCt |
|---|---|---|---|---|---|---|---|---|
| G1 / G1a | 1 | ∞ | 2.20 | 1.74320 | 49.3 | | 0.341 | 0.798 |
| | 2 | 90.263 | 13.53 | | | | | |
| | 3 | -216.070 | 2.00 | 1.74100 | 52.7 | | 0.346 | 0.816 |
| | 4 | 292.390 | 0.80 | | | | | |
| | 5 | 150.340 | 6.28 | 1.80518 | 25.4 | | 0.305 | 0.668 |
| | 6 | ∞ | 1.25 (VARIABLE) | | | | | |
| G1b | 7 | 141.850 | 7.14 | 1.43387 | 95.2 | * | 0.345 | 0.798 |
| | 8 | -597.020 | 0.20 | | | | | |
| | 9 | ∞ | 2.20 | 1.80518 | 25.4 | | 0.305 | 0.668 |
| | 10 | 97.300 | 1.34 | | | | | |
| | 11 | 102.580 | 12.87 | 1.43387 | 95.2 | * | 0.345 | 0.798 |
| | 12 | -131.790 | 0.20 | | | | | |
| | 13 | 142.870 | 7.35 | 1.43387 | 95.2 | * | 0.345 | 0.798 |
| | 14 | -323.150 | 0.20 | | | | | |
| | 15 | 112.000 | 5.87 | 1.61800 | 63.4 | * | 0.345 | 0.809 |
| | 16 | 2217.900 | 0.20 | | | | | |
| | 17 | 75.890 | 4.69 | 1.71300 | 53.9 | | 0.347 | 0.819 |
| | 18 | 158.680 | 1.48 (VARIABLE) | | | | | |
| G2 | 19 | 46.157 | 1.20 | 1.80400 | 46.6 | | 0.337 | 0.779 |
| | 20 | 20.980 | 3.46 | | | | | |
| | 21 | 56.230 | 1.20 | 1.77250 | 49.6 | | 0.341 | 0.796 |
| | 22 | 40.240 | 3.47 | | | | | |
| | 23 | -70.672 | 1.20 | 1.69680 | 55.5 | | 0.350 | 0.833 |
| | 24 | 22.634 | 3.24 | | | | | |
| | 25 | 28.260 | 3.67 | 1.80518 | 25.4 | | 0.304 | 0.659 |
| | 26 | 175.000 | 52.73 (VARIABLE) | | | | | |
| G3 | 27 | -23.876 | 1.20 | 1.77250 | 49.6 | | 0.341 | 0.796 |
| | 28 | 37.515 | 2.66 | 1.84666 | 23.9 | | 0.302 | 0.650 |
| | 29 | -501.190 | 11.61 (VARIABLE) | | | | | |
| G4 / | 30 | (DIAPHRAGM) | 3.00 | | | | | |
| G4a | 31 | -127.380 | 4.00 | 1.49700 | 81.5 | * | 0.350 | 0.826 |
| | 32 | -38.868 | 0.20 | | | | | |
| | 33 | 33.475 | 6.40 | 1.51742 | 52.4 | | 0.341 | 0.799 |
| | 34 | -33.475 | 1.40 | 1.80610 | 40.9 | | 0.329 | 0.748 |
| | 35 | -175.000 | 40.00 | | | | | |
| G4b | 36 | 61.677 | 4.50 | 1.51742 | 52.4 | | 0.341 | 0.799 |
| | 37 | -259.700 | 0.20 | | | | | |
| | 38 | 28.430 | 7.20 | 1.49700 | 81.5 | * | 0.350 | 0.826 |
| | 39 | -83.000 | 1.40 | 1.80400 | 46.6 | | 0.337 | 0.779 |
| | 40 | 22.785 | 2.40 | | | | | |
| | 41 | 32.909 | 8.20 | 1.51835 | 60.3 | | 0.350 | 0.823 |
| | 42 | -23.805 | 1.40 | 1.80440 | 39.6 | | 0.328 | 0.744 |
| | 43 | -297.600 | 0.20 | | | | | |
| | 44 | 31.833 | 6.50 | 1.48749 | 70.2 | | 0.363 | 0.892 |
| | 45 | -54.658 | 10.83 | | | | | |
| | 46 | ∞ | 33.00 | 1.58267 | 46.5 | | 0.331 | 0.772 |
| | 47 | ∞ | 13.20 | 1.51633 | 64.1 | | 0.357 | 0.867 |
| | 48 | ∞ | | | | | | |

(*: MATERIAL SATISFYING CONDITION OF ANOMALOUS DISPERSION CHARACTERISTIC)

FIG. 11

| | EXAMPLE 4 · BASIC LENS DATA | | | | | | |
|---|---|---|---|---|---|---|---|
| | SURFACE NO. | Ri | Di | Ndj | νdj | | θCA' | θCt |
| G1 | 1 | 61.215 | 1.8 | 1.80518 | 25.4 | | 0.305 | 0.668 |
| | 2 | 41.010 | 1.12 | | | | | |
| | 3 | 41.662 | 7.42 | 1.49700 | 81.5 | * | 0.350 | 0.826 |
| | 4 | 1126.500 | 0.2 | | | | | |
| | 5 | 48.426 | 4.68 | 1.49700 | 81.5 | * | 0.350 | 0.826 |
| | 6 | 197.080 | 0.2 | | | | | |
| | 7 | 54.348 | 3.06 | 1.61800 | 63.4 | * | 0.345 | 0.809 |
| | 8 | 120.140 | 1.03 (VARIABLE) | | | | | |
| G2 | 9 | 66.225 | 0.8 | 1.80440 | 39.6 | | 0.328 | 0.744 |
| | 10 | 17.422 | 3.27 | | | | | |
| | 11 | -53.252 | 0.8 | 1.83400 | 37.2 | | 0.325 | 0.732 |
| | 12 | 15.198 | 2.2 | | | | | |
| | 13 | 18.051 | 4.74 | 1.80518 | 25.4 | | 0.305 | 0.668 |
| | 14 | -26.525 | 1.21 | 1.80440 | 39.6 | | 0.328 | 0.744 |
| | 15 | 41.701 | 28.78 (VARIABLE) | | | | | |
| G3 | 16 | -36.900 | 1.2 | 1.77250 | 49.6 | | 0.341 | 0.796 |
| | 17 | 33.784 | 2 | 1.80518 | 25.4 | | 0.305 | 0.668 |
| | 18 | ∞ | 4.25 (VARIABLE) | | | | | |
| | 19 | (DIAPHRAGM) | 3 | | | | | |
| G4 / G4a | 20 | 41.494 | 4.8 | 1.48749 | 70.2 | | 0.363 | 0.892 |
| | 21 | -28.932 | 0.4 | | | | | |
| | 22 | 36.429 | 4.4 | 1.51742 | 52.4 | | 0.341 | 0.799 |
| | 23 | -36.429 | 0.6 | | | | | |
| | 24 | -22.919 | 1.4 | 1.77250 | 49.6 | | 0.341 | 0.796 |
| | 25 | -204.620 | 10 | | | | | |
| G4b | 26 | -26.316 | 3 | 1.51633 | 64.1 | | 0.358 | 0.869 |
| | 27 | -19.011 | 1.6 | | | | | |
| | 28 | 58.000 | 1.6 | 1.80518 | 25.4 | | 0.305 | 0.668 |
| | 29 | 21.459 | 2 | | | | | |
| | 30 | 66.144 | 3.4 | 1.48749 | 70.2 | | 0.363 | 0.892 |
| | 31 | -116.960 | 0.4 | | | | | |
| | 32 | 23.866 | 4.4 | 1.49700 | 81.5 | * | 0.350 | 0.826 |
| | 33 | -91.743 | 10.96 | | | | | |
| | 34 | ∞ | 33 | 1.58267 | 46.5 | | 0.331 | 0.772 |
| | 35 | ∞ | 12.5 | 1.51633 | 64.1 | | 0.357 | 0.867 |
| | 36 | ∞ | | | | | | |

(*: MATERIAL SATISFYING CONDITION OF ANOMALOUS DISPERSION CHARACTERISTIC)

FIG. 12

| | | COMPARATIVE EXAMPLE · BASIC LENS DATA | | | | | |
|---|---|---|---|---|---|---|---|
| | SURFACE NO. | Ri | Di | Ndj | νdj | θCA' | θCt |
| G1 / G1a | 1 | −333.03 | 2.40 | 1.80518 | 25.4 | 0.305 | 0.668 |
| | 2 | 114.17 | 11.45 | 1.48749 | 70.2 | 0.363 | 0.892 |
| | 3 | −200.031 | 0.12 | | | | |
| | 4 | 169.1432 | 6.04 | 1.48749 | 70.2 | 0.363 | 0.892 |
| | 5 | −900.354 | 7.20 (VARIABLE) | | | | |
| G1b | 6 | 107.31 | 6.15 | 1.63854 | 55.4 | 0.342 | 0.797 |
| | 7 | 726.6232 | 0.12 | | | | |
| | 8 | 68.6486 | 5.85 | 1.79952 | 42.2 | 0.331 | 0.754 |
| | 9 | 166.7602 | 0.92 (VARIABLE) | | | | |
| G2 | 10 | 79.506 | 0.82 | 1.83400 | 37.2 | 0.325 | 0.732 |
| | 11 | 14.8477 | 5.37 | | | | |
| | 12 | −54.4744 | 0.82 | 1.78800 | 47.4 | 0.338 | 0.784 |
| | 13 | 31.1425 | 2.46 | | | | |
| | 14 | 26.0996 | 4.94 | 1.84666 | 23.8 | 0.304 | 0.661 |
| | 15 | −34.8286 | 0.39 | | | | |
| | 16 | −28.1156 | 0.82 | 1.83481 | 42.7 | 0.332 | 0.759 |
| | 17 | 79.3145 | 54.24 (VARIABLE) | | | | |
| G3 | 18 | −29.1483 | 0.82 | 1.78800 | 47.4 | 0.338 | 0.784 |
| | 19 | 44.223 | 2.86 | 1.84666 | 23.8 | 0.304 | 0.661 |
| | 20 | −356.936 | 4.00 (VARIABLE) | | | | |
| | 21 | (DIAPHRAGM) | 1.61 | | | | |
| G4 / G4a | 22 | 217.8665 | 5.00 | 1.58267 | 46.5 | 0.331 | 0.772 |
| | 23 | −31.6637 | 0.12 | | | | |
| | 24 | 166.92 | 3.40 | 1.58913 | 61.2 | 0.351 | 0.837 |
| | 25 | −851.16 | 0.12 | | | | |
| | 26 | 49.3953 | 7.10 | 1.48749 | 70.2 | 0.363 | 0.892 |
| | 27 | −30.778 | 1.25 | 1.83400 | 37.2 | 0.325 | 0.732 |
| | 28 | −548.294 | 34.00 | | | | |
| G4b | 29 | 41.2274 | 6.10 | 1.51742 | 52.2 | 0.342 | 0.799 |
| | 30 | −55.1035 | 0.12 | | | | |
| | 31 | 57.7229 | 5.40 | 1.48749 | 70.2 | 0.363 | 0.892 |
| | 32 | −38.155 | 1.30 | 1.83481 | 42.7 | 0.332 | 0.759 |
| | 33 | 20.9716 | 2.16 | | | | |
| | 34 | 27.0435 | 9.60 | 1.51824 | 59.0 | 0.348 | 0.819 |
| | 35 | −20.71 | 1.25 | 1.83481 | 42.7 | 0.332 | 0.759 |
| | 36 | −95.5901 | 0.20 | | | | |
| | 37 | 62.3218 | 6.27 | 1.48749 | 70.2 | 0.363 | 0.892 |
| | 38 | −28.434 | 10.50 | | | | |
| | 39 | ∞ | 33.00 | 1.58267 | 46.5 | 0.331 | 0.772 |
| | 40 | ∞ | 13.20 | 1.51633 | 64.1 | 0.357 | 0.867 |
| | 41 | ∞ | | | | | |

(*: MATERIAL SATISFYING CONDITION OF ANOMALOUS DISPERSION CHARACTERISTIC)

FIG. 13A

| EXAMPLE 1 · ZOOM DATA | | |
|---|---|---|
| | WIDE-ANGLE END | TELEPHOTO END |
| FOCAL LENGTH (mm) | 8.30 | 161.05 |
| F NUMBER | 1.74 | 2.48 |
| ZOOM GROUP SPACING 1 (D11) | 0.98 | 56.50 |
| ZOOM GROUP SPACING 2 (D19) | 57.30 | 7.12 |
| ZOOM GROUP SPACING 3 (D22) | 6.76 | 1.42 |

FIG. 13B

| EXAMPLE 1 · FOCUS DATA | | |
|---|---|---|
| OBJECT DISTANCE | 3.0m | 1.0m |
| FOCUS GROUP MOVEMENT AMOUNT (mm) | 1.88 | 5.86 |

FIG. 13C

| EXAMPLE 1 · POWER OF MATERIAL HAVING ANOMALOUS DISPERSION CHARACTERISTIC | | |
|---|---|---|
| | FOCAL LENGTH | POWER |
| LENSES L11-L15 | 74.33 | 0.0135 |
| LENS L12 | 295.55 | 0.0034 |
| LENS L13 | 292.06 | 0.0034 |
| LENS L14 | 161.79 | 0.0062 |
| ΦB/ΦA | | 0.965 |

FIG. 14A

| EXAMPLE 2 · ZOOM DATA | | |
|---|---|---|
| | WIDE-ANGLE END | TELEPHOTO END |
| FOCAL LENGTH (mm) | 8.97 | 165.06 |
| F NUMBER | 1.84 | 2.63 |
| ZOOM GROUP SPACING 1 (D9) | 0.92 | 51.88 |
| ZOOM GROUP SPACING 2 (D17) | 54.24 | 6.05 |
| ZOOM GROUP SPACING 3 (D20) | 4.00 | 1.24 |

FIG. 14B

| EXAMPLE 2 · FOCUS DATA | | |
|---|---|---|
| OBJECT DISTANCE | 3.0m | 1.0m |
| FOCUS GROUP MOVEMENT AMOUNT (mm) | 1.88 | 5.81 |

FIG. 14C

| EXAMPLE 2 · POWER OF MATERIAL HAVING ANOMALOUS DISPERSION CHARACTERISTIC | | |
|---|---|---|
| | FOCAL LENGTH | POWER |
| LENSES L11-L15 | 74.24 | 0.0135 |
| LENS L12 | 148.04 | 0.0068 |
| ΦB/ΦA | | 0.502 |

FIG. 15A

| EXAMPLE 3 · ZOOM DATA | | |
|---|---|---|
| | WIDE-ANGLE END | TELEPHOTO END |
| FOCAL LENGTH (mm) | 8.74 | 101.42 |
| F NUMBER | 2.22 | 2.22 |
| ZOOM GROUP SPACING 1 (D18) | 1.48 | 57.50 |
| ZOOM GROUP SPACING 2 (D26) | 52.72 | 4.60 |
| ZOOM GROUP SPACING 3 (D29) | 11.61 | 3.72 |

FIG. 15B

| EXAMPLE 3 · FOCUS DATA | | |
|---|---|---|
| OBJECT DISTANCE | 3.0m | 1.0m |
| FOCUS GROUP MOVEMENT AMOUNT (mm) | 4.14 | 11.57 |

FIG. 15C

| EXAMPLE 3 · POWER OF MATERIAL HAVING ANOMALOUS DISPERSION CHARACTERISTIC | | |
|---|---|---|
| | FOCAL LENGTH | POWER |
| LENSES L11-L19 | 69.49 | 0.0144 |
| LENS L14 | 264.95 | 0.0038 |
| LENS L16 | 135.19 | 0.0074 |
| LENS L17 | 229.43 | 0.0044 |
| LENS L18 | 190.67 | 0.0052 |
| $\Phi B/\Phi A$ | | 1.444 |
| LENSES L41-L43 | 47.82 | 0.0209 |
| LENS L41 | 110.88 | 0.0090 |
| $\Phi B/\Phi A$ | | 0.431 |
| LENSES L44-L49 | 50.96 | 0.0196 |
| LENS L45 | 43.54 | 0.0230 |
| $\Phi B/\Phi A$ | | 1.170 |

FIG. 16A

| EXAMPLE 4 - ZOOM DATA | | |
|---|---|---|
| | WIDE-ANGLE END | TELEPHOTO END |
| FOCAL LENGTH (mm) | 12.22 | 94.08 |
| F NUMBER | 2.82 | 2.82 |
| ZOOM GROUP SPACING 1 (D8) | 1.03 | 28.30 |
| ZOOM GROUP SPACING 2 (D15) | 28.78 | 4.29 |
| ZOOM GROUP SPACING 3 (D18) | 4.25 | 1.46 |

FIG. 16B

| EXAMPLE 4 - FOCUS DATA | | |
|---|---|---|
| OBJECT DISTANCE | 3.0m | 1.0m |
| FOCUS GROUP MOVEMENT AMOUNT (mm) | 0.97 | 3.00 |

FIG. 16C

| EXAMPLE 4 - POWER OF MATERIAL HAVING ANOMALOUS DISPERSION CHARACTERISTIC | | |
|---|---|---|
| | FOCAL LENGTH | POWER |
| LENSES L11-L14 | 53.42 | 0.0187 |
| LENS L12 | 86.85 | 0.0115 |
| LENS L13 | 127.84 | 0.0078 |
| LENS L14 | 157.78 | 0.0063 |
| ΦB/ΦA | | 1.372 |
| LENSES L41-L47 | 40.92 | 0.0244 |
| LENS L47 | 38.59 | 0.0259 |
| ΦB/ΦA | | 1.060 |

FIG. 17A

| COMPARATIVE EXAMPLE · ZOOM DATA | WIDE-ANGLE END | TELEPHOTO END |
|---|---|---|
| FOCAL LENGTH (mm) | 8.92 | 164.06 |
| F NUMBER | 1.84 | 2.62 |
| ZOOM GROUP SPACING 1 (D9) | 0.92 | 52.52 |
| ZOOM GROUP SPACING 2 (D17) | 54.24 | 5.05 |
| ZOOM GROUP SPACING 3 (D20) | 4.00 | 1.59 |

FIG. 17B

| COMPARATIVE EXAMPLE · FOCUS DATA | | |
|---|---|---|
| OBJECT DISTANCE | 3.0m | 1.0m |
| FOCUS GROUP MOVEMENT AMOUNT (mm) | 1.90 | 5.90 |

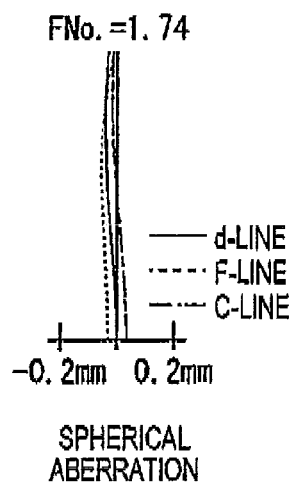
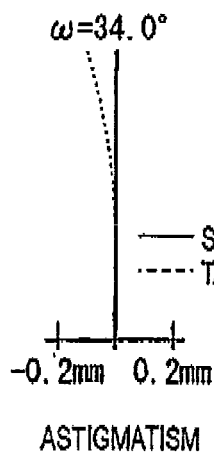
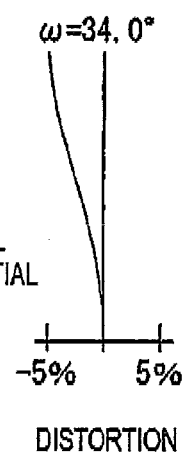
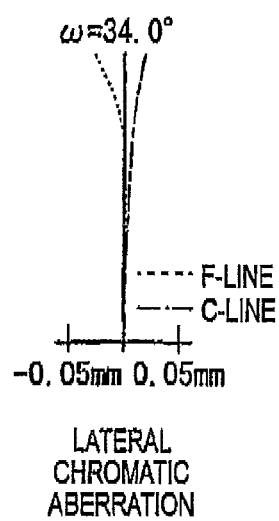
FIG. 18A — SPHERICAL ABERRATION (FNo.=1.74)
FIG. 18B — ASTIGMATISM (ω=34.0°)
FIG. 18C — DISTORTION (ω=34.0°)
FIG. 18D — LATERAL CHROMATIC ABERRATION (ω=34.0°)
EXAMPLE 1 · TELEPHOTO END (3m)
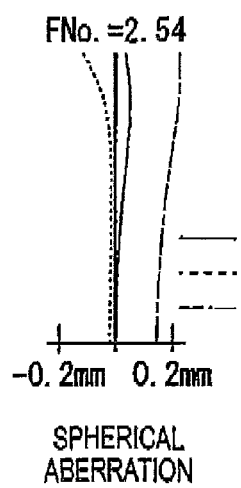
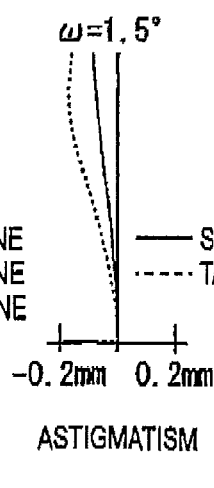
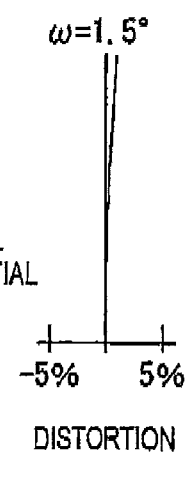
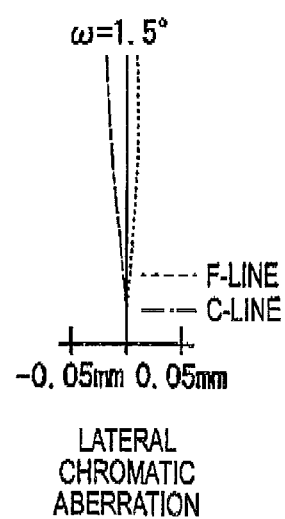
FIG. 19A — SPHERICAL ABERRATION (FNo.=2.54)
FIG. 19B — ASTIGMATISM (ω=1.5°)
FIG. 19C — DISTORTION (ω=1.5°)
FIG. 19D — LATERAL CHROMATIC ABERRATION (ω=1.5°)

FNo.=1.85

— d-LINE
---- F-LINE
—·— C-LINE

-0.2mm  0.2mm

SPHERICAL ABERRATION

ω=31.6°

— SAGITTAL
---- TANGENTIAL

-0.2mm  0.2mm

ASTIGMATISM

ω=31.6°

-5%  5%

DISTORTION

ω=31.6°

---- F-LINE
—·— C-LINE

-0.05mm  0.05mm

LATERAL CHROMATIC ABERRATION

EXAMPLE 2 · TELEPHOTO END (3m)

FNo.=2.72

— d-LINE
---- F-LINE
—·— C-LINE

-0.2mm  0.2mm

SPHERICAL ABERRATION

ω=1.5°

— SAGITTAL
---- TANGENTIAL

-0.2mm  0.2mm

ASTIGMATISM

ω=1.5°

-5%  5%

DISTORTION

ω=1.5°

---- F-LINE
—·— C-LINE

-0.05mm  0.05mm

LATERAL CHROMATIC ABERRATION

EXAMPLE 3 · WIDE-ANGLE END (3m)

SPHERICAL ABERRATION

ASTIGMATISM

DISTORTION

LATERAL CHROMATIC ABERRATION

EXAMPLE 3 · TELEPHOTO END (3m)

SPHERICAL ABERRATION

ASTIGMATISM

DISTORTION

LATERAL CHROMATIC ABERRATION

EXAMPLE 4 · WIDE-ANGLE END (3m)

SPHERICAL ABERRATION

ASTIGMATISM

DISTORTION

LATERAL CHROMATIC ABERRATION

EXAMPLE 4 · TELEPHOTO END (3m)

SPHERICAL ABERRATION

ASTIGMATISM

DISTORTION

LATERAL CHROMATIC ABERRATION

COMPARATIVE EXAMPLE · WIDE-ANGLE END (3m)
FIG. 26A  FIG. 26B  FIG. 26C  FIG. 26D
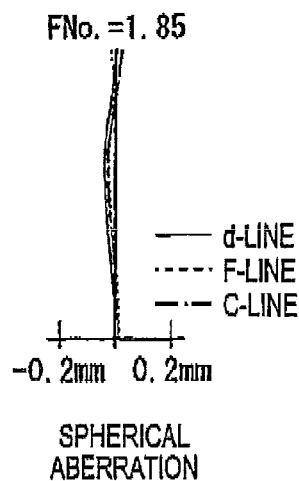
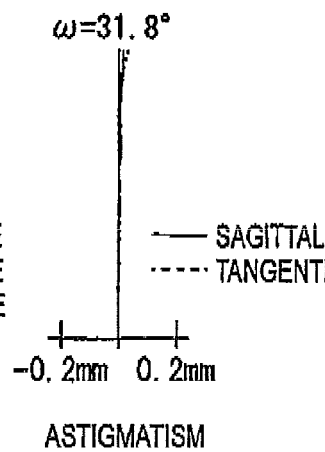
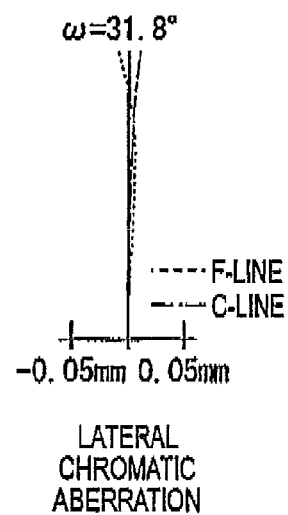
SPHERICAL ABERRATION   ASTIGMATISM   DISTORTION   LATERAL CHROMATIC ABERRATION
EXAMPLE A · TELEPHOTO END (3m)
FIG. 27A  FIG. 27B  FIG. 27C  FIG. 27D
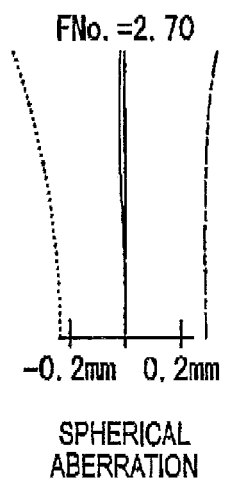
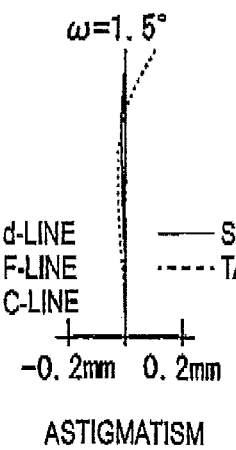
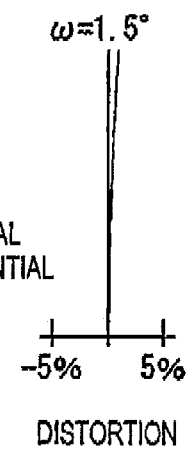
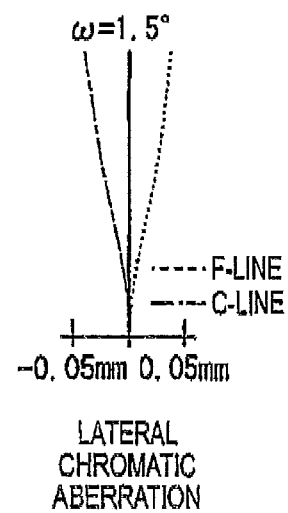
SPHERICAL ABERRATION   ASTIGMATISM   DISTORTION   LATERAL CHROMATIC ABERRATION

ZOOM LENS AND IMAGING APPARATUS

The present application claims priority from Japanese Patent Application No. 2008-295424 filed on Nov. 19, 2008, the entire content of which is incorporated herein by reference.

BACKGROUND OF INVENTION

1. Field of the Invention

The present invention relates to a zoom lens used as, e.g., an imaging lens for a TV (television) camera, and an imaging apparatus for converting an optical image formed using the zoom lens to an electrical imaging signal.

2. Description of the Related Art

In an optical system using a solid-state imaging device such as a CCD (Charge Coupled Device) and a CMOS (Complementary Metal Oxide Semiconductor), since these devices have high sensitivity even in an infrared region, an infrared ray cut filter reducing a transmittance near the A'-line (about 750 nm) to about 50% (half value) is often inserted. Nevertheless, since aberration in a red region may significantly affect image quality and resolving power, correction of chromatic aberration from the C-line (656.3 nm) to the A'-line (768.2 nm) is important. In addition, in the optical system having moving groups, the chromatic aberration may be corrected for each group such that the chromatic aberration is not fluctuated during variation of magnification. Relationally, in the correction of the chromatic aberration, particularly in the correction of secondary spectrum, it is known that the use of an optical material having an anomalous dispersion characteristic is effective (see JP-A-2007-163964 corresponding to U.S. Pat. No. 7,292,398 B1, JP-A-2006-349947 corresponding to U.S. Pat. No. 7,304,805 B2, JP-A-2005-345892 corresponding to U.S. Pat. No. 7,139,131 B2, and JP-A-2006-78964).

However, with attention focused on the correction of the chromatic aberration in a blue region, only a lens system paying attention to a partial dispersion ratio in a blue region, e.g., the partial dispersion ratio θg,F related to the g-line (435.8 nm) and the F-line (486.1 nm) is described, and the correction of the chromatic aberration in the red region is not sufficient. In particular, there is a case where the blue region and the red region have different tendencies of the anomalous dispersion characteristic depending on materials, and therefore, there is a possibility that the sufficient correction of the chromatic aberration may not be performed with attention paid only to the anomalous dispersion characteristic in the blue region.

SUMMARY OF INVENTION

The present invention has been achieved in view of the above description and an object of the present invention is to provide a zoom lens and an imaging apparatus capable of performing the correction of the chromatic aberration particularly in the red region more excellently than the related arts.

According to an aspect of the invention, a zoom lens includes: a first lens group having a positive refractive power; a second lens group having a negative refractive power; a third lens group having a negative refractive power; and a fourth lens group having a positive refractive power, in order from an object side of the zooming lens, wherein the second lens group monotonically moves toward an image side of the zooming lens along an optical axis of the zooming lens for a zooming from a wide-angle end to a telephoto end of the zooming lens, wherein the third lens group moves along the optical axis to compensate of a fluctuation of an image surface of the zooming lens resulting from the zooming of the second lens group, and wherein at least one positive lens having an optical material satisfying conditional expressions (1) and (2) shown below is included in at least one of the first lens group and the fourth lens group which are positive lens groups:

$$vd > 60 \tag{1}$$

$$\theta C, A' < 0.001198 vd + 0.2765 \tag{2}$$

wherein vd represents an Abbe number of the optical material at the d-line, θC,A' represents a partial dispersion ratio when a partial dispersion of the optical material is set to (nC−nA'), nC represents a refractive index of the optical material at the C-line, and nA' represents a refractive index of the optical material at the A'-line.

In the zoom lens according to the present invention, the optimization of the lens structure is performed by using an appropriate optical material with attention paid to the partial dispersion ratio in the red region, whereby it is possible to correct the chromatic aberration particularly in the red region more excellently than the related art. In the zoom lens according to the present invention, the optical material having the anomalous dispersion characteristic which satisfies the conditions and is favorable for the correction of the chromatic aberration is used in the lens which has a relatively strong power in the lens group and tends to cause the chromatic aberration, particularly in the positive lens in the lens group having the positive refractive power (at least one of the first lens group and the fourth lens group), whereby effective correction of the chromatic aberration is performed.

In addition, by further adopting and satisfying the following structures as needed, the correction of the chromatic aberration is more effectively performed.

According to an aspect of the invention, the at least one positive lens having the optical material may further satisfy a conditional expression (3):

$$0.330 < \theta C, A' < 0.360 \tag{3}$$

According to an aspect of the invention, the first lens group and the fourth lens group may be stationary lens groups during the zooming.

According to an aspect of the invention, the first lens group may have a front group and a rear group and one of the front group and the rear group move along the optical axis to perform focusing of the zoom lens, and the at least one positive lens having the optical material is arranged at least in the first lens group.

According to an aspect of the invention, the fourth lens group may have a front group and a rear group which form a widest air space in the optical axis therebetween in the fourth lens group, and the at least one positive lens having the optical material is arranged at least in the fourth lens group.

According to an aspect of the invention, a conditional expression (4) may be satisfied:

$$\Phi B / \Phi A > 0.4 \tag{4}$$

Wherein ΦA represents a power of the first or fourth lens group including the at least one positive lens having the optical material, and ΦB represents a total sum of the power of the at least one positive lens having the optical material in accordance with the first or fourth lens group. When ΦA represents the power of the first lens group including the at least one positive lens having the optical material and the first lens group has front and rear groups, the first lens group is the power of the entire front and rear groups of the first lens group. When ΦB represents the power of the fourth lens group including the at least one positive lens having the optical material and the fourth lens group has front and rear groups, the fourth lens group is the power of either the front or rear group.

According to an aspect of the invention, an imaging apparatus includes a zoom lens and an imaging device which outputs an imaging signal in correspondence to an optical image formed using the zoom lens.

According to the zoom lens of the present invention, since the positive lens having the optical material appropriately optimized with attention paid to the partial dispersion ratio in the red region is included in the lens group having the positive refractive power (at least one of the first lens group and the fourth lens group), it is possible to perform the correction of the chromatic aberration particularly in the red region more excellently than the related art.

In addition, according to the imaging apparatus of the present invention, since the high performance zoom lens of the present invention described above is used as the imaging lens, it is possible to obtain the shot image with high image quality.

BRIEF DESCRIPTION OF THE DRAWINGS

FIG. 2 shows a second structural example of the zoom lens according to the embodiment of the present invention, and is a cross-sectional view of lenses in correspondence to Example 2;

FIG. 3 shows a third structural example of the zoom lens according to the embodiment of the present invention, and is a cross-sectional view of lenses in correspondence to Example 3;

FIG. 4 shows a fourth structural example of the zoom lens according to the embodiment of the present invention, and is a cross-sectional view of lenses in correspondence to Example 4;

FIG. 8 is a view showing basic lens data on a zoom lens according to Example 1;

FIG. 9 is a view showing basic lens data on a zoom lens according to Example 2;

FIG. 10 is a view showing basic lens data on a zoom lens according to Example 3;

FIG. 11 is a view showing basic lens data on a zoom lens according to Example 4;

FIG. 12 is a view showing basic lens data on a zoom lens according to Comparative Example;

FIGS. 13(A) to 13(C) are views showing the other data on the zoom lens according to Example 1 in which FIG. 13(A) shows data related to variation of magnification, FIG. 13(B) shows data related to focusing, and FIG. 13(C) shows data related to a power of a lens having an optical material having an anomalous dispersion characteristic;

FIGS. 14(A) to 14(C) are views showing the other data on the zoom lens according to Example 2 in which FIG. 14(A) shows data related to the variation of magnification, FIG. 14(B) shows data related to the focusing, and FIG. 14(C) shows data related to the power of the lens having the optical material having the anomalous dispersion characteristic;

FIGS. 15(A) to 15(C) are views showing the other data on the zoom lens according to Example 3 in which FIG. 15(A) shows data related to the variation of magnification, FIG. 15(B) shows data related to the focusing, and FIG. 15(C) shows data related to the power of the lens having the optical material having the anomalous dispersion characteristic;

FIGS. 16(A) to 16(C) are views showing the other data on the zoom lens according to Example 4 in which FIG. 16(A) shows data related to the variation of magnification, FIG. 16(B) shows data related to the focusing, and FIG. 16(C) shows data related to the power of the lens having the optical material having the anomalous dispersion characteristic;

FIGS. 17(A) and 17(B) are views showing the other data on the zoom lens according to Comparative Example in which FIG. 17(A) shows data related to the variation of magnification and FIG. 17(B) shows data related to the focusing;

FIGS. 18(A) to 18(D) are aberration diagrams showing aberrations at a wide-angle end of the zoom lens according to Example 1 in which FIG. 18(A) shows spherical aberration, FIG. 18(B) shows astigmatism, FIG. 18(C) shows distortion, and FIG. 18(D) shows lateral chromatic aberration;

FIGS. 19(A) to 19(D) are aberration diagrams showing the aberrations at a telephoto end of the zoom lens according to Example 1 in which FIG. 19(A) shows the spherical aberration, FIG. 19(B) shows the astigmatism, FIG. 19(C) shows the distortion, and FIG. 19(D) shows the lateral chromatic aberration;

FIGS. 20(A) to 20(D) are aberration diagrams showing the aberrations at the wide-angle end of the zoom lens according to Example 2 in which FIG. 20(A) shows the spherical aberration, FIG. 20(B) shows the astigmatism, FIG. 20(C) shows the distortion, and FIG. 20(D) shows the lateral chromatic aberration;

FIGS. 21(A) to 21(D) are aberration diagrams showing the aberrations at the telephoto end of the zoom lens according to Example 2 in which FIG. 21(A) shows the spherical aberration, FIG. 21(B) shows the astigmatism, FIG. 21(C) shows the distortion, and FIG. 21(D) shows the lateral chromatic aberration;

FIGS. 22(A) to 22(D) are aberration diagrams showing the aberrations at the wide-angle end of the zoom lens according to Example 3 in which FIG. 22(A) shows the spherical aberration, FIG. 22(B) shows the astigmatism, FIG. 22(C) shows the distortion, and FIG. 22(D) shows the lateral chromatic aberration;

FIGS. 23(A) to 23(D) are aberration diagrams showing the aberrations at the telephoto end of the zoom lens according to Example 3 in which FIG. 23(A) shows the spherical aberration, FIG. 23(B) shows the astigmatism, FIG. 23(C) shows the distortion, and FIG. 23(D) shows the lateral chromatic aberration;

FIGS. 24(A) to 24(D) are aberration diagrams showing the aberrations at the wide-angle end of the zoom lens according to Example 4 in which FIG. 24(A) shows the spherical aberration, FIG. 24(B) shows the astigmatism, FIG. 24(C) shows the distortion, and FIG. 24(D) shows the lateral chromatic aberration;

FIGS. 25(A) to 25(D) are aberration diagrams showing the aberrations at the telephoto end of the zoom lens according to Example 4 in which FIG. 25(A) shows the spherical aberration, FIG. 25(B) shows the astigmatism, FIG. 25(C) shows the distortion, and FIG. 25(D) shows the lateral chromatic aberration;

FIGS. 26(A) to 26(D) are aberration diagrams showing the aberrations at the wide-angle end of the zoom lens according to Comparative Example in which FIG. 26(A) shows the spherical aberration, FIG. 26(B) shows the astigmatism, FIG. 26(C) shows the distortion, and FIG. 26(D) shows the lateral chromatic aberration;

FIGS. 27(A) to 27(D) are aberration diagrams showing the aberrations at the telephoto end of the zoom lens according to Comparative Example in which FIG. 27(A) shows the spherical aberration, FIG. 27(B) shows the astigmatism, FIG. 27(C) shows the distortion, and FIG. 27(D) shows the lateral chromatic aberration.

DESCRIPTION OF EXEMPLARY EMBODIMENTS

A detailed description is given hereinbelow to an embodiment of the present invention with reference to the drawings.

Figure 1A:
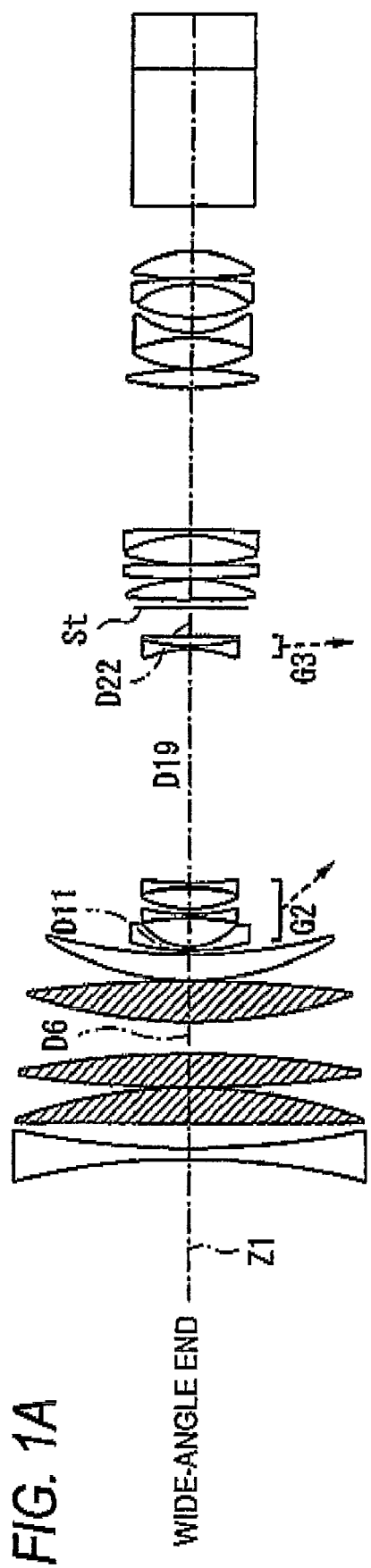
FIG. 1 shows a first structural example of a zoom lens according to an embodiment of the present invention, and is a cross-sectional view of lenses in correspondence to Example 1.
Figure 1B:
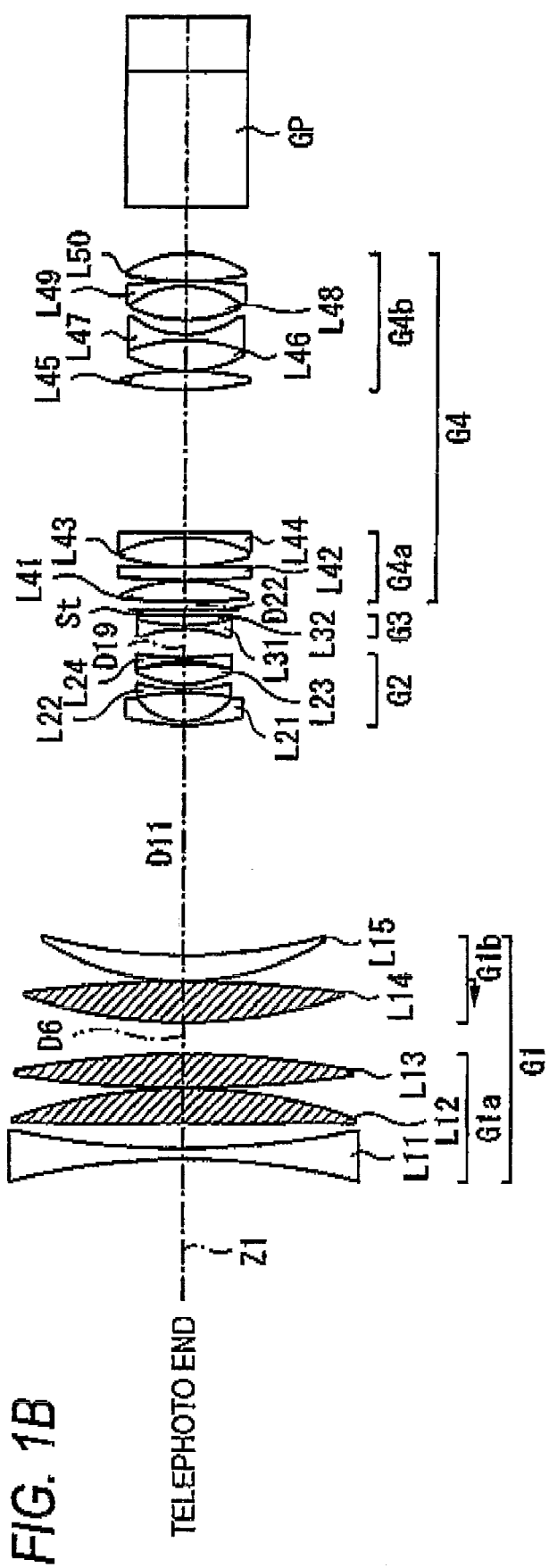

FIGS. 1(A) and 1(B) show a first structural example of a zoom lens according to the embodiment of the present invention. The structural example corresponds to a lens structure of a first numerical example (FIG. 8 and FIGS. 13(A) to 13(C)) that will be discussed later. FIG. 1(A) corresponds to an optical system arrangement during infinity focusing at a wide-angle end (state of the shortest focal length), while FIG. 1(B) corresponds to the optical system arrangement during the infinity focusing at a telephoto end (state of the longest focal length). Similarly, cross-sectional structures of second to fourth structural examples corresponding to lens structures of second to fourth numerical examples that will be discussed later are shown in FIGS. 2(A) and 2(B) to FIGS. 4(A) and 4(B). In FIGS. 1(A) and 1(B) to FIGS. 4(A) and 4(B), surfaces of constituent elements are sequentially numbered from an object side toward an image side (image formation side) in ascending order beginning at 1 given to the surface of the constituent element closest to the object side, and a reference numeral Di indicates a surface spacing on an optical axis Z1 between the i-th surface and the (i+1)-th surface. With regard to the reference numeral Di, only the surface spacing at a portion changing in accordance with variation of magnification and focusing is provided with the reference numeral. It is to be noted than a description will be given by adopting the structural example of the zoom lens shown in FIGS. 1(A) and 1(B) as a basis, and the structural examples in FIGS. 2(A) and 2(B) to FIGS. 4(A) and 4(B) will also be described as needed.

The zoom lens is an imaging lens mounted on, e.g., a camera or a video camera for TV broadcasting. The zoom lens includes a first lens group G1 having positive refractive power, a second lens group G2 having negative refractive power, a third lens group G3 having the negative refractive power, and a fourth lens group G4 having the positive refractive power which are arranged in order from the object side along the optical axis Z1. An optical aperture diaphragm St is disposed between the third lens group G3 and the fourth lens group G4.

On the image side of the zoom lens, there is disposed an optical material in accordance with the structure of an imaging part of the camera on which the zoom lens is mounted. For example, on an image formation surface (imaging surface) of the zoom lens, an imaging device such as the CCD, the MOS, or the like is disposed. In addition, between the final lens group (the fourth lens group G4) and the imaging surface, a prism block for color separation (color separation optical system) GP is disposed as in, e.g., a 3CCD camera. The imaging apparatus according to the present embodiment includes at least the zoom lens and the imaging device.

Figure 28:
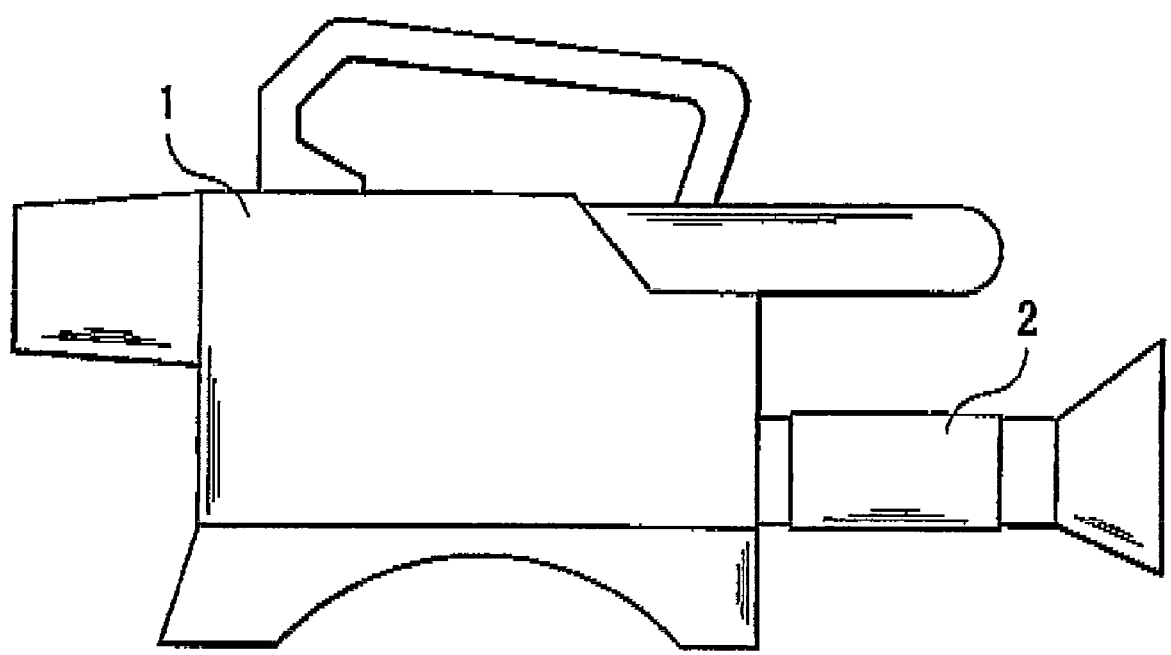
FIG. 28 is a structural view showing an example of a camera on which the zoom lens according to the embodiment of the present invention is mounted.

FIG. 28 shows an example of a camera as the imaging apparatus to which the zoom lens according to the present embodiment is applied.

The camera includes a camera body 1 and a camera lens 2 mounted on the camera body 1. In the camera body 1, there are provided an imaging device for outputting an imaging signal in correspondence to a subject image formed using the camera lens 2 such as the CCD or the like, a signal processing circuit for processing the imaging signal outputted from the imaging device and generating an image, and a recording medium for recording the generated image. By using the zoom lens in the present embodiment as the camera lens 2 in the camera of this type, it is possible to obtain a shot image with high image quality in which the correction of the chromatic aberration in the red region is excellently performed.

The zoom lens is structured such that the second and third lens groups G2 and G3 are moved along the optical axis Z1 during variation of magnification. More specifically, the variation of magnification from the wide-angle end to the telephoto end is performed by monotonically moving the second lens group G2 toward the image side along the optical axis Z1, and the compensation of fluctuation of the image surface resulting from the variation of magnification is performed by moving the third lens group G3 along the optical axis Z1. The first and fourth lens groups G1 and G4 are stationary lens groups during a power varying operation.

In the zoom lens, a structure may be adopted in which the first lens group G1 is comprised of a front group G1$a$ and a rear group G1$b$, and focusing is performed by moving one of the front group G1$a$ and the rear group G1$b$ along the optical axis Z1. In the structural examples in FIGS. 1(A) and 1(B), and FIGS. 2(A) and 2(B), the first lens group G1 is divided into the front group G1$a$ and the rear group G1$b$, and the focusing to a short distance side is performed by moving the rear group G1$b$ along the optical axis Z1 toward the object side. In the structural examples in FIGS. 1(A) and 1(B), and FIGS. 2(A) and 2(B), the front lens group G1$a$ of the first lens group G1 is comprised of three lenses L11, L12, and L13, and the rear group G1$b$ thereof is comprised of two lenses L14 and L15.

In the structural example in FIGS. 3(A) and 3(B), the first lens group G1 is divided into the front group G1$a$ and the rear group G1$b$, and the focusing to the short distance side is performed by moving the front group G1$a$ toward the object side along the optical axis Z1. In the structural example in FIGS. 3(A) and 3(B), the front group G1$a$ of the first lens group G1 is comprised of three lenses L11, L12, and L13, and the rear group G1$b$ thereof is comprised of six lenses L14, L15, L16, L17, L18, and L19.

As in the structural example in FIGS. 4(A) and 4(B), the focusing to the short distance side may also be performed by moving the entire first lens group G1 toward the object side along the optical axis Z1. In the structural example in FIGS. 4(A) and 4(B), the first lens group G1 is comprised of four lenses L11, L12, L13, and L14.

The second lens group G2 is comprised of, e.g., four lenses L21, L22, L23, and L24. The third lens group G3 is comprised of a cemented lens consisting of, e.g., two lenses L31 and L32.

The fourth lens group G4 is comprised of a front group G4$a$ and a rear group G4$b$ with the widest air space therebetween in the fourth lens group G4. In the structural examples in FIGS. 1(A) and 1(B), and FIGS. 2(A) and 2(B), the front group G4a of the fourth lens group G4 is composed of four lenses L41, L42, L43, and L44, and the rear group G4b thereof is comprised of six lenses L45, L46, L47, L48, L49, and L50. In the structural example in FIGS. 3(A) and 3(B), the front group G4a of the fourth lens group G4 is composed of three lenses L41, L42, and L43, and the rear group G4b thereof is composed of six lenses L44, L45, L46, L47, L48, and L49. In the structural example in FIGS. 4(A) and 4(B), the front group G4a of the fourth lens group G4 is comprised of three lenses L41, L42, and L43, and the rear group G4b thereof is comprised of four lenses L44, L45, L46, and L47.

The zoom lens according to the present embodiment includes at least one positive lens having an optical material satisfying the following conditional expressions (1) and (2) in the lens group having the positive refractive power (at least one of the first lens group G1 and the fourth lens group G4). The meaning of satisfying these conditional expressions will be discussed later:

$$vd>60 \qquad (1)$$

$$\theta C, A' < 0.001198 vd + 0.2765 \qquad (2)$$

wherein vd is an Abbe number at the d-line, and θC,A' is a partial dispersion ratio when partial dispersion is given by (nC−nA') (nC is a refractive index at the C-line, and nA' is a refractive index at the A'-line).

When the conditional expressions (1) and (2) are satisfied, the following conditional expression may be further satisfied:

$$0.330 < \theta C, A' < 0.360 \qquad (3).$$

In FIGS. 1(A) and 1(B) to FIGS. 4(A) and 4(B), hatched lens parts by oblique lines are the positive lenses each having the optical material having a anomalous dispersion characteristic satisfying the conditional expressions (1), (2), and (3).

In the structural example in FIGS. 1(A) and 1(B), the two lenses L12 and L13 in the front group G1a of the first lens group G1, and the lens L14 in the rear group G1b thereof are the positive lenses each having the optical material. In the structural example in FIGS. 2(A) and 2(B), the lens L12 in the front group G1a of the first lens group G1 is the positive lens having the optical material. In the structural example in FIGS. 3(A) and 3(B), the four lenses L14, L16, L17, and L18 in the rear group G1b of the first lens group G1, the lens L41 in the front group G4a of the fourth lens group G4, and the lens L45 in the rear group G4a thereof are the positive lenses each having the optical material. In the structural example in FIGS. 4(A) and 4(B), the three lenses L12, L13, and L14 in the first lens group G1, and the lens L47 in the rear group G4a of the fourth lens group G4 are the positive lenses each having the optical material.

In the first lens group G1 or the fourth lens group G4, the number of used positive lenses each including the optical material, and positions where the positive lenses are disposed are not limited to the examples shown in the structural examples in FIGS. 1(A) and 1(B) to FIGS. 4(A) and 4(B). The number of used positive lenses may be larger than the number thereof shown in each of the structural examples. The positive lenses may be disposed at positions different from those shown in each of the structural examples.

In the zoom lens according to the present embodiment, when the power of the entire group in which the positive lens having the optical material is included (when the group is comprised of the front group and the rear group, the entire first lens group G1 with regard to the first lens group G1, and the entire front group G4a or the entire rear group G4b with regard to the fourth lens group G4) is represented by ΦA, and the total sum of the power of the positive lens having the optical material in the group is represented by ΦB, the following conditional expression may be satisfied:

$$\Phi B / \Phi A > 0.4 \qquad (4).$$

Next, a description will be given to the operation and the effect of the zoom lens thus structured.

In the zoom lens, the optimization of the lens structure is performed by using an appropriate optical material with attention paid to the partial dispersion ratio in the red region, whereby the chromatic aberration particularly in the red region is corrected more excellently than the related art. In the zoom lens, the optical material having the anomalous dispersion characteristic which satisfies at least the conditional expressions (1) and (2) and is favorable for the correction of the chromatic aberration is used particularly in the lens which has a relatively strong power in the group and tends to cause the chromatic aberration, more particularly in the positive lens in the lens group having the positive refractive power (at least one of the first lens group G1 and the fourth lens group G4), whereby effective correction of the chromatic aberration is performed.

In the group having the optical material having the anomalous dispersion characteristic, the power (the inverse of focal length) of the lens having the optical material may serve as the main power of the group because that results in the effective use of the anomalous dispersion characteristic of the optical material. In this respect, the condition of the conditional expression (4) may be satisfied. As is represented by the conditional expression (4), the total sum ΦB of the power of the positive lens having the optical material in the group may be more than 40% of the power ΦA of the group. In order to enhance the effect, the total sum ΦB of the power of the positive lens having the optical material may not be less than 100% of the power ΦA of the group. When the optical material is used in the positive lens as a part of the cemented lens, with regard to ΦB in the conditional expression (4), the power is calculated from the focal length of the positive lens separated from the cemented lens.

The conditional expressions (1) to (3) relate to the anomalous dispersion characteristic. A description will be given hereinbelow to the meaning of satisfying the conditional expressions (1) to (3). A ratio of partial dispersion (nx−ny) as a difference between refractive indexes of two given wavelengths to main dispersion (nF−nC) as a difference between the refractive indexes of the F-line and the C-line (nx−ny)/(nF−nC) is referred to as a partial dispersion ratio (θx, y). When a straight line joining two standard glass types is assumed to be a reference line on a graph having the partial dispersion ratio (θx, y) as a vertical axis and the Abbe number vd as a horizontal axis, an optical material distributed at a position apart from the reference line is generally referred to as an optical material "having the anomalous dispersion characteristic".

For example, when a straight line joining NSL7 (nd=1.51112, vd=60.5) and PBM2 (nd=1.62004, vd=36.3), which are two glass types manufactured by OHARA INC., is assumed to be the reference line, with regard to the partial dispersion ratio θC,A' in a long wavelength (red) region, NSL7=0.3492 and PBM2=0.3198 give the following expression of the reference line:

$$\theta C, A' \approx 0.001215\, vd + 0.2757 \qquad (A)$$

wherein vd=(nd−1)/(nF−nC) is satisfied (nd is a refractive index at the d-line).

On the other hand, with regard to the partial dispersion ratio θg,F in a short wavelength (blue) region, NSL7=0.5436 and PBM2=0.5828 give the following expression of the reference line:

$$\theta g, F \approx -0.001620 vd + 0.6416 \quad (B).$$

Many glass types are distributed along the reference lines, but the glass type having higher anomalous dispersion characteristic is disposed farther from the reference lines, and is effective in the correction of the chromatic aberration and a reduction in the secondary spectrum.

Figure 5:
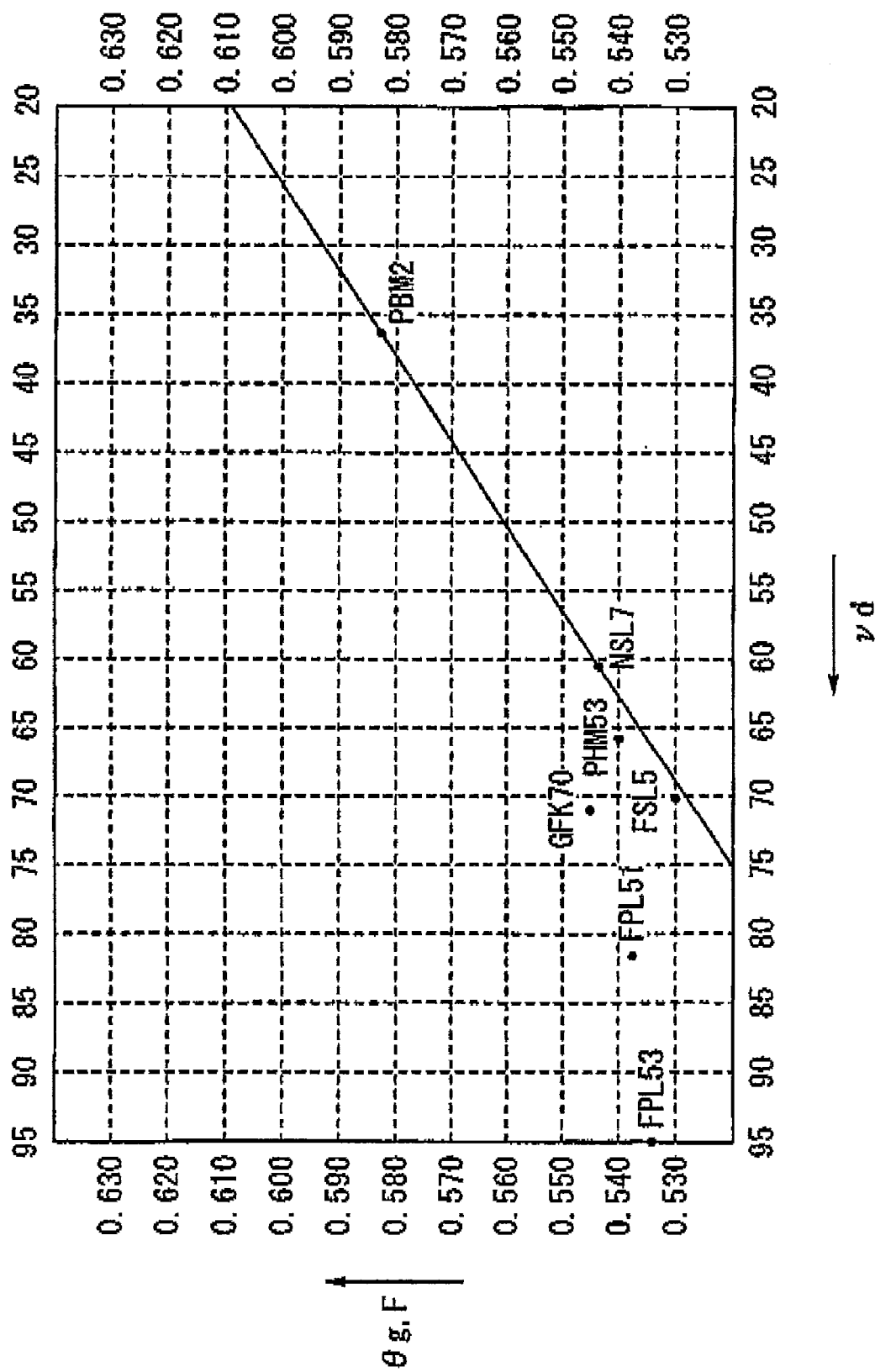
FIG. 5 is an explanatory view showing a relation between a partial dispersion ratio θg,F in a blue region from the g-line to the F-line and an Abbe number vd.
Figure 6:
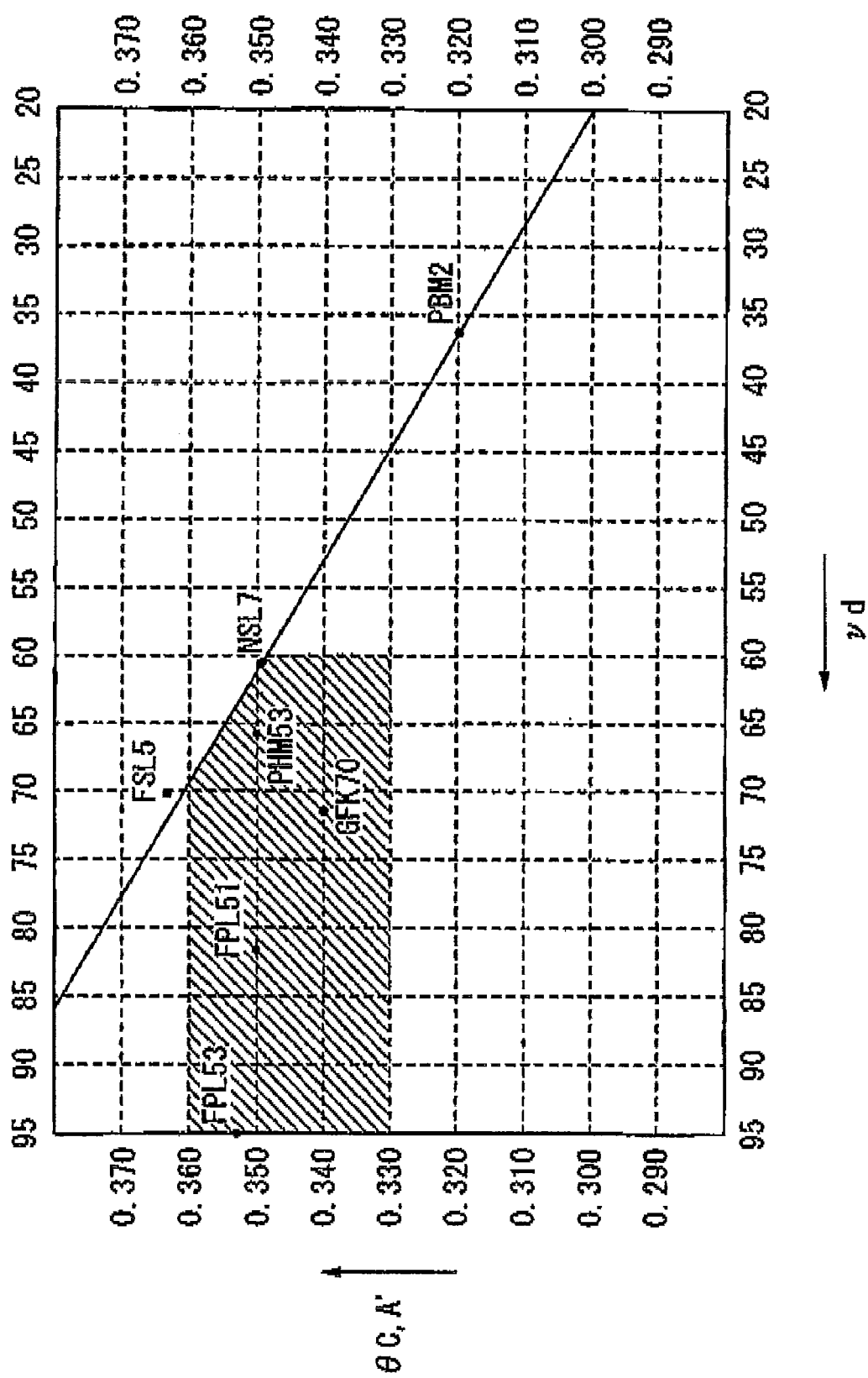
FIG. 6 is an explanatory view showing the relation between a partial dispersion ratio θC,A' in a red region from the C-line to the A'-line and the Abbe number vd.

FIG. 5 shows a plot of the relation between the partial dispersion ratio θg,F in the blue region and the Abbe number vd with regard to each of several typical optical materials manufactured by OHARA INC. and SUMITA Optical glass, Inc. The reference line given by the expression (B) is indicated by a solid line. FIG. 6 also shows a plot of the relation between the partial dispersion ratio C,A' in the red region and the Abbe number vd with regard to each of similar typical optical materials. The reference line given by the expression (A) is indicated by the solid line.

Taking FSL5 (nd=1.48749, vd=70.2) manufactured by OHARA INC. which is considered to be a low dispersion glass material and has the anomalous dispersion characteristic in the blue region as an example, the partial dispersion ratio θC,A' calculated by the expression (A) is 0.361, and the partial dispersion ratio θg,F calculated by the expression (B) is 0.528. In contrast to this, the actual partial dispersion ratio θC,A' of FSL5 is 0.3633, and the actual partial dispersion ratio θg,F thereof is 0.5300. Accordingly, the amount of the anomalous dispersion of the short wavelength is +0.002, and FSL5 is positioned on a +side (on the left side of the reference line in FIG. 5) in the same manner as other glass materials each having the anomalous dispersion characteristic. However, in the red region, FSL5 is distributed at a position of +0.002 in a direction from the reference line opposite to the direction of other glass materials each having the anomalous dispersion characteristic (the right side of the reference line in the graph of FIG. 6). That is, FSL5 is positioned on the same side as the side with FPL53, FPL51, and PHM53 manufactured by OHARA INC. and GFK70 manufactured by SUMIDA Optical glass, Inc. at the reference line on the θg,F-vd graph of FIG. 5, while FSL5 is positioned on the side opposite to the side with FPL53 and the like at the reference line on the θC,A'-vd graph of FIG. 6.

Like FSL5, among the optical materials, there exist materials having the tendencies of the anomalous dispersion characteristic different in the red region and in the blue region. Therefore, when the glass material is selected with attention paid only to the anomalous dispersion characteristic in the blue region to reduce the chromatic aberration, there are cases where it is not possible to perform sufficient correction of the chromatic aberration in the red region. Because of this, in the present embodiment, the lens material satisfying the conditional expressions (1), (2), and (3) is selected with attention paid to the partial dispersion ratio θC,A' in the red region from the C-line to the A'-line, whereby it becomes possible to excellently correct the chromatic aberration in the red region. In FIG. 6, the region highlighted by oblique lines corresponds to a region satisfying the conditional expressions (1), (2), and (3).

It is to be noted that the selection of the material may be performed by using the partial dispersion ratio θC,t paying attention even to the t-line (1014 nm) with a longer wavelength. That is, the material satisfying the following conditional expressions may be selected. θC,t represents the partial dispersion ratio when the partial dispersion is given by (nC−nt) (nC is a refractive index at the C-line, and nt is a refractive index at the t-line):

$$vd > 60 \quad (1)$$

$$\theta C, t < 0.004700 vd + 0.5460 \quad (5)$$

$$0.760 < \theta C, t < 0.855 \quad (6).$$

Figure 7:
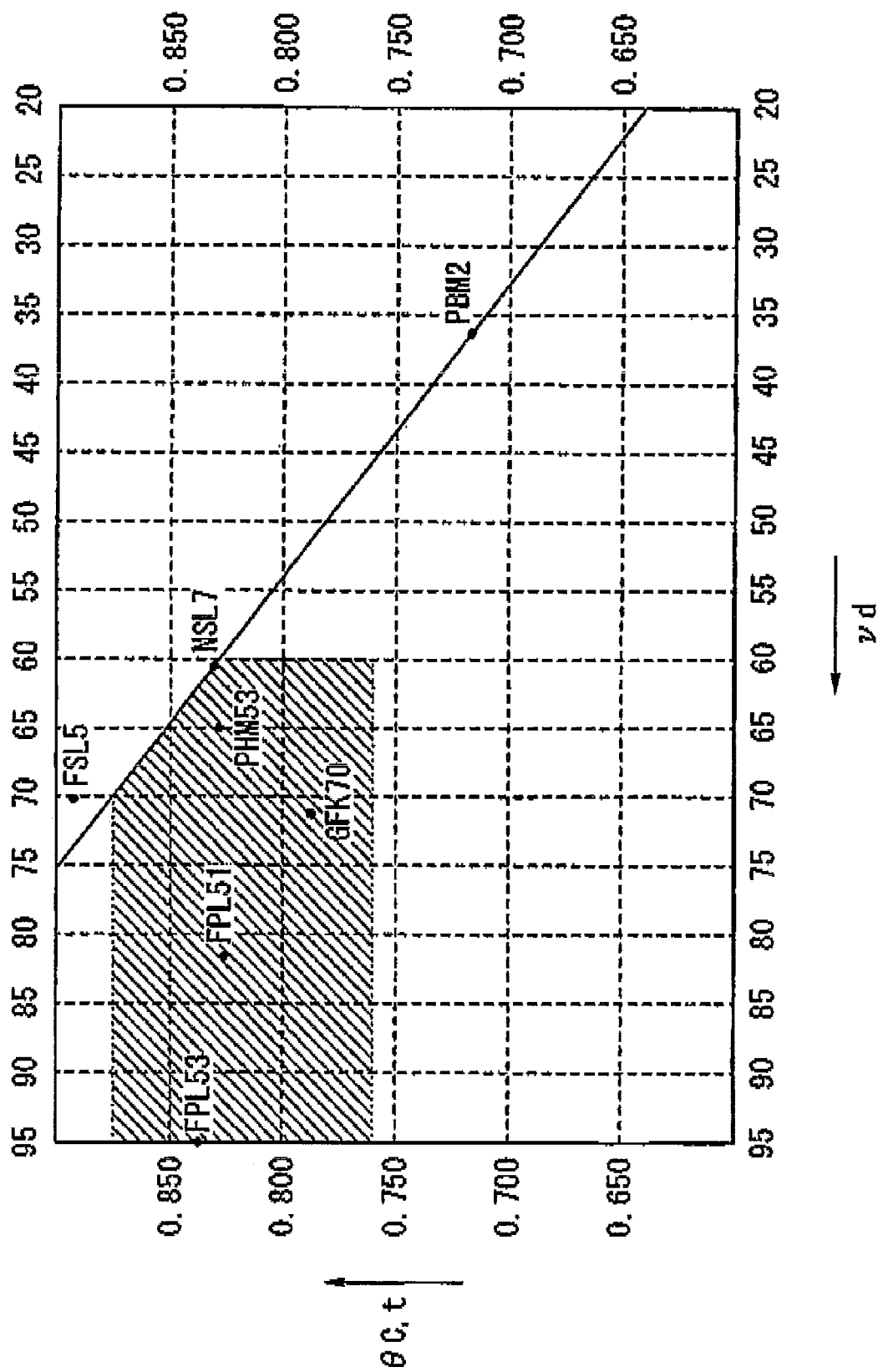
FIG. 7 is an explanatory view showing the relation between a partial dispersion ratio θC,t in the red region from the C-line to the t-line and the Abbe number vd.
Figure 20A:
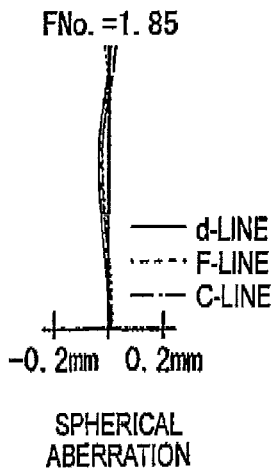
Figure 20B:
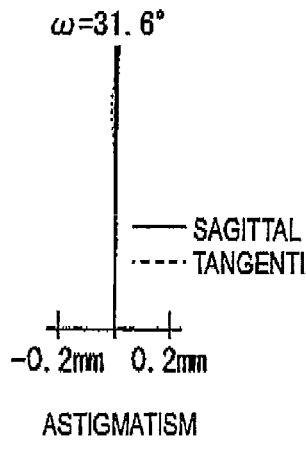
Figure 20C:
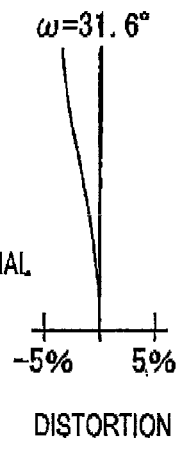
Figure 20D:
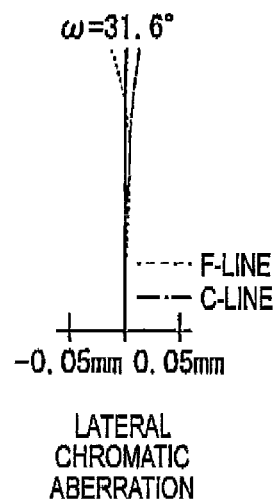
Figure 21A:
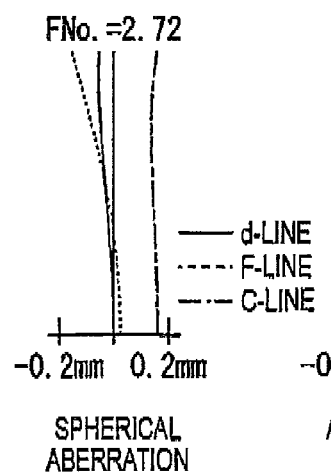
Figure 21B:
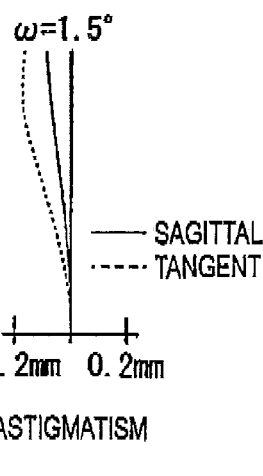
Figure 21C:
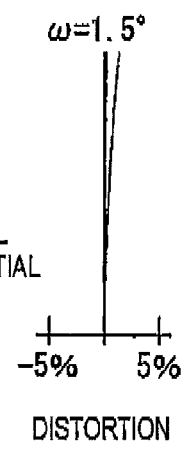
Figure 21D:
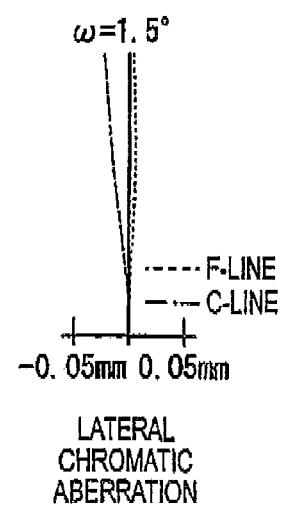
Figure 22A:
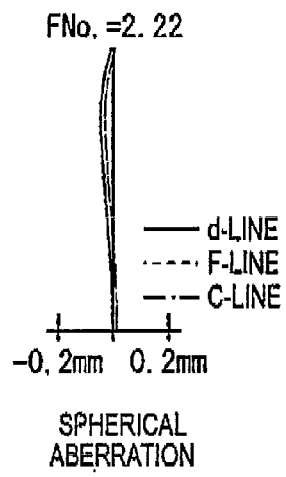
Figure 22B:
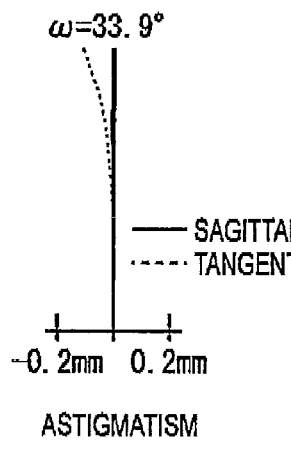
Figure 22C:
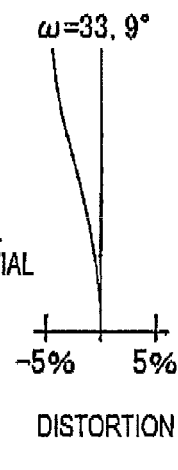
Figure 22D:
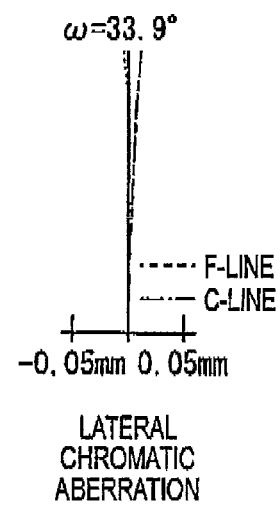
Figure 23A:
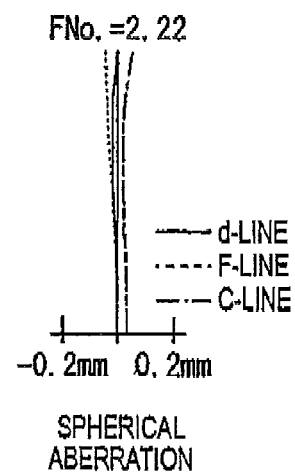
Figure 23B:
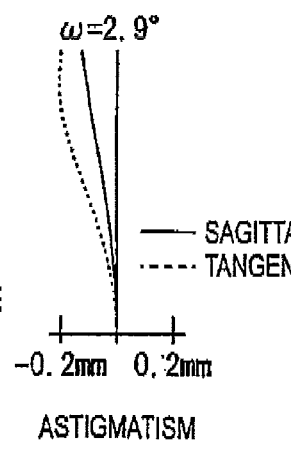
Figure 23C:
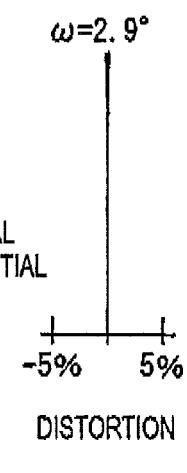
Figure 23D:
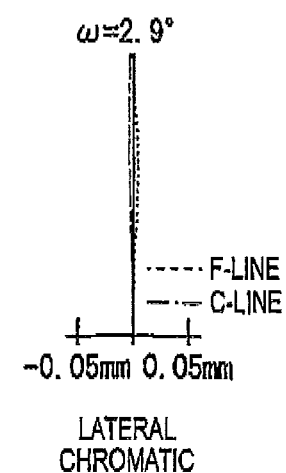
Figure 24A:
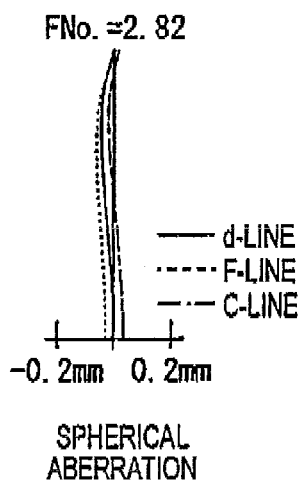
Figure 24B:
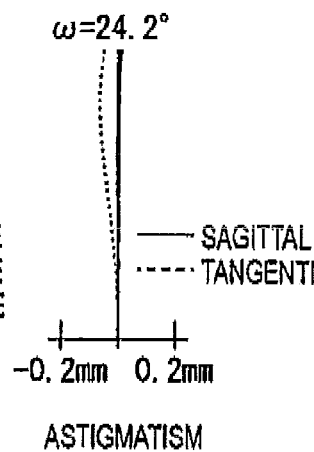
Figure 24C:
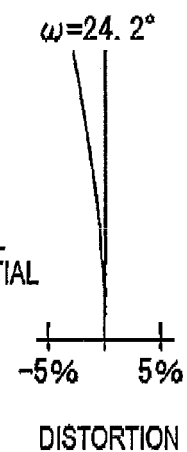
Figure 24D:
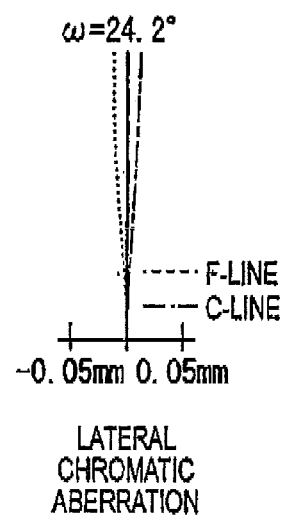
Figure 25A:
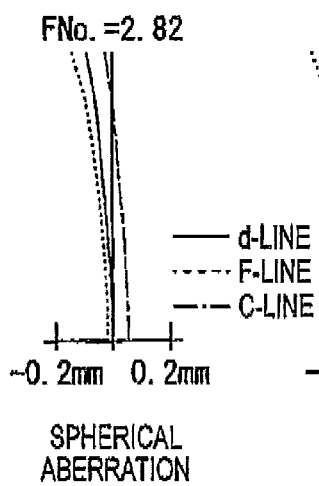
Figure 25B:
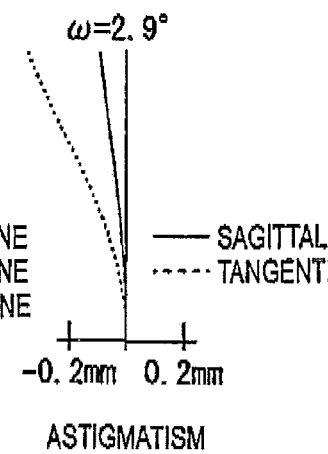
Figure 25C:
Figure 25D:
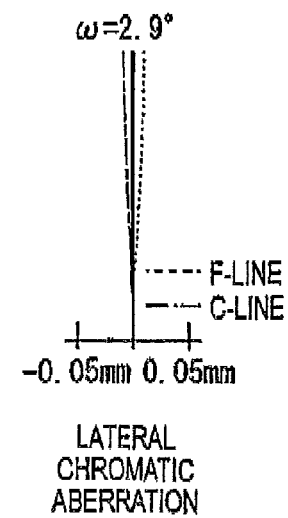

FIG. 7 shows a plot of the relation between the partial dispersion ratio θC,t in a longer-wavelength region and the Abbe number vd with regard to each of several typical optical materials manufactured by OHARA INC. and SUMIDA Optical glass, Inc. in the same manner as in FIGS. 5 and 6. The reference line determined by using NSL7 and PBM2 is shown by the solid line. In FIG. 7, the region highlighted by oblique lines corresponds to a region satisfying the conditional expressions (1), (5), and (6).

As has been described thus far, according to the zoom lens of the present embodiment, since the optimization of the lens structure is performed by using an appropriate optical material with attention paid to the partial dispersion ratio in the red region, it is possible to perform the correction of the chromatic aberration particularly in the red region more excellently than the related art. In addition, according to the imaging apparatus on which the zoom lens according to the present embodiment is mounted, since the zoom lens is used as the imaging lens, it is possible to obtain a shot image with high image quality.

EXAMPLE

Next, a description is given to specific numerical examples of the zoom lens according to the present embodiment. A plurality of numerical examples is collectively described hereinbelow.

FIG. 8 and FIGS. 13(A) to 13(C) show specific lens data in correspondence to the structure of the zoom lens shown in FIGS. 1(A) and 1(B). In particular, FIG. 8 shows basic lens data thereon, and FIGS. 13(A) to 13(C) show the other data related to the variation of magnification, the focusing, and the like. Surfaces of constituent elements of the zoom lens according to Example 1 are sequentially numbered from the object side toward the image side in ascending order beginning at 1 given to the surface of the constituent element closest to the object side, and surface NO. in the lens data shown in FIG. 8 denotes the number of the i-th (i=1, 2, 3 ... ) surface. A section of curvature radius Ri indicates a value (mm) of the curvature radius of the i-th surface from the object side. A section of surface spacing Di similarly indicates a spacing (mm) on the optical axis between the i-th surface Si and the (i+1)-th surface Si+1 from the object side. A section of Ndj indicates a value of a refractive index of the j-th optical element (j=1, 2, 3 ... ) from the object side at the d-line (587.6 nm). A section of vdj indicates an Abbe number of the j-th optical element from the object side at the d-line.

FIG. 8 also shows values of the partial dispersion ratios θC,A' and θC,t. In the zoom lens according to Example 1, the two lenses L12 and L13 in the front group G1a of the first lens group G1 and the lens L14 in the rear group G1b thereof are the positive lenses each using the optical material, and are the optical materials each having the anomalous dispersion characteristic which satisfy the conditional expressions (1), (2), and (3). Further, the lenses also satisfy the conditional expressions (1), (5), and (6). A part showing the optical material having the anomalous dispersion characteristic is provided with a mark "*".

In the zoom lens according to Example 1, since the second lens group G2 and the third lens group G3 are moved on the optical axis during the power varying operation, values of the surface spacings D11, D19, and D22 anterior and posterior to the individual groups are variable. FIG. 13(A) shows data during the infinity focusing at the wide-angle end (state of the shortest focal length) in correspondence to the lens arrangement in FIG. 1(A), and data during the infinity focusing at the telephoto end (state of the longest focal length) in correspondence to the lens arrangement in FIG. 1(B) as data on the surface spacings D11, D19, and D22 during the power varying operation. FIG. 13(A) also shows values of the focal length and an F number at the wide-angle end and the telephoto end.

In the zoom lens according to Example 1, the rear group G1b of the first lens group G1 is moved on the optical axis during the focusing. FIG. 13(G) shows values when the object distance is 3.0 m and 1.0 m as data on the movement amount of the rear group G1b during the focusing.

FIG. 13(C) shows values related to ΦA and ΦB in the conditional expression (4). In the zoom lens according to Example 1, since the two lenses L12 and L13 in the front group G1a of the first lens group G1 and the lens L14 in the rear group G1b thereof are the optical materials each having the anomalous dispersion characteristic, ΦA represents the power of the entire first lens group G1 (lenses L11 to L15), while ΦB represents the total sum of the power of the lenses L12, L13, and L14 in the first lens group G1.

Similarly to the zoom lens according to Example 1 described thus far, specific lens data in correspondence to the structure of the zoom lens shown in FIGS. 2(A) and 2(B) is shown in FIG. 9 and FIGS. 14(A) to 14(C) as Example 2.

In the zoom lens according to Example 2, the lens L12 in the front group G1a of the first lens group G1 is the positive lens using the optical material, and is the optical material having the anomalous dispersion characteristic which satisfies the conditional expressions (1), (2), and (3). In addition, the lens L12 also satisfies the conditional expressions (1), (5), and (6). FIG. 14(C) shows values related to ΦA and ΦB in the conditional expression (4). Since the lens L12 in the front group G1a f the first lens group G1 is the optical material having the anomalous dispersion characteristic, ΦA represents the power of the entire first lens group G1 (lenses L11 to L15), while ΦB represents the power of the lens L12.

Similarly, specific lens data in correspondence to the structure of the zoom lens shown in FIGS. 3(A) and 3(B) is shown in FIG. 10 and FIGS. 15(A) to 15(C) as Example 3.

In the zoom lens according to Example 3, the four lenses L14, L16, L17, and L15 in the rear group G1b of the first lens group G1, the lens L41 in the front group G4a of the fourth lens group G4, and the lens L45 in the rear group G4b thereof are the positive lenses each having the optical material, and are the optical materials each having the anomalous dispersion characteristic which satisfy the conditional expressions (1), (2), and (3). In addition, these lenses also satisfy the conditional expressions (1), (5), and (6). FIG. 15(C) shows values related to ΦA and ΦB in the conditional expression (4). However, since the zoom lens according to Example 3 includes the positive lenses each having the optical material in the first lens group G1, the front group G4a of the fourth lens group G4, and the rear group G4b thereof, values of ΦA and ΦB are calculated for each group.

Similarly, specific lens data in correspondence to the structure of the zoom lens shown in FIGS. 4(A) and 4(B) is shown in FIG. 11 and FIGS. 16(A) to 16(C) as Example 4.

In the zoom lens according to Example 4, the three lenses L12, L13, and L14 in the first lens group G1 and the lens L47 in the rear group G4b of the fourth lens group G4 are the positive lenses each having the optical material, and are the optical materials each having the anomalous dispersion characteristic which satisfy the conditional expressions (1), (2), and (3). In addition, these lenses also satisfy the conditional expressions (1), (5), and (6). FIG. 16(C) shows values related to ΦA and ΦB in the conditional expression (4). However, since the zoom lens according to Example 4 includes the positive lenses each having the optical material in the first lens group G1 and the rear group G4b of the fourth lens group G4, values of ΦA and ΦB are calculated for each group.

Further, lens data on a zoom lens according to Comparative Example is shown in FIG. 12 and FIGS. 17(A) and 17(B). In Comparative Example, a rough lens structure as a basis is similar to the lens structure in Example 2, and the cross section of the lenses is also similar to the one in FIGS. 2(A) and 2(B). However, the optical material satisfying conditions related to the anomalous dispersion characteristic in the present embodiment is not used in Comparative Example.

FIGS. 18(A) to 18(D) respectively show spherical aberration, astigmatism, distortion, and lateral chromatic aberration in a state where the focusing is performed at a short distance (3 m) at the wide-angle end in the zoom lens according to Example 1. Each of aberration diagrams shows the aberration using the d-line as a reference wavelength. In the spherical aberration diagram and the lateral chromatic aberration diagram, the aberrations concerning the F-line and the C-line are also shown. In the astigmatism diagram, the solid line indicates the aberration in a sagittal direction, while the broken line indicates the aberration in a tangential direction. FNo. indicates the F number, and ω indicates a half angle of view. Similarly, FIGS. 19(A) to 19(D) respectively show the spherical aberration, the astigmatism, the distortion, and the lateral chromatic aberration in a state where the focusing is performed at the short distance (3 m) at the telephoto end.

Similarly, the aberrations in the zoom lens according to Example 2 are shown in FIGS. 20(A) to 20(D) (wide-angle end), and FIGS. 21(A) to 21(D) (telephoto end). Further, similarly, the aberrations in the zoom lens according to Example 3 are shown in FIGS. 22(A) to 22(D) (wide-angle end), and FIGS. 23(A) to 23(D) (telephoto end). Furthermore, similarly, the aberrations in the zoom lens according to Example 4 are shown in FIGS. 24(A) to 24(D) (wide-angle end) and FIGS. 25(A) to 25(D) (telephoto end), Moreover, the aberrations in the zoom lens according to Comparative Example are shown in FIGS. 26(A) to 26(D) (wide-angle end) and FIGS. 27(A) to 27(D) (telephoto end).

As seen from the respective aberration diagrams, with regard to the lens of each Example, the lateral chromatic aberration and longitudinal chromatic aberration are excellently corrected. On the other hand, with regard to the lens of Comparative Example, since the optical material having the anomalous dispersion characteristic is not used, the corrections of the lateral chromatic aberration and the longitudinal chromatic aberration are not sufficient.

It is to be noted that the present invention is not limited to the embodiment and each Example, and various modifications thereof may be made. For example, values of the curvature radius, the surface spacing, and the refractive index of each lens constituent are not limited to those shown in each numerical example described above, and the values may be other values.

What is claimed is:

1. A zoom lens comprising:
   a first lens group having a positive refractive power;
   a second lens group having a negative refractive power;
   a third lens group having a negative refractive power; and a fourth lens group having a positive refractive power, in order from an object side of the zooming lens, wherein the second lens group monotonically moves toward an image side of the zooming lens along an optical axis of the zooming lens for a zooming from a wide-angle end to a telephoto end of the zooming lens, wherein the third lens group moves along the optical axis to compensate of a fluctuation of an image surface of the zooming lens resulting from the zooming of the second lens group, and wherein at least one positive lens having an optical material satisfying conditional expressions (1) and (2) shown below is included in at least one of the first lens group and the fourth lens group which are positive lens groups:

$$vd > 60 \quad (1)$$

$$\theta C,A' < 0.001198 vd + 0.2765 \quad (2)$$

wherein vd represents an Abbe number of the optical material at the d-line, $\theta C,A'$ represents a partial dispersion ratio when a partial dispersion of the optical material is set to $(nC-nA')$, nC represents a refractive index of the optical material at the C-line, and nA' represents a refractive index of the optical material at the A'-line.

2. The zoom lens of claim 1, wherein the at least one positive lens having the optical material further satisfies a conditional expression (3):

$$0.330 < \theta C,A' < 0.360 \quad (3).$$

3. The zoom lens of claim 1, wherein the first lens group and the fourth lens group are stationary lens groups during the power variable operation.

4. The zoom lens of claim 1, wherein the first lens group has a front group and a rear group and one of the front group and the rear group moves along the optical axis to perform focusing of the zoom lens, and the at least one positive lens having the optical material is arranged at least in the first lens group.

5. The zoom lens of claim 1, wherein the fourth lens group has a front group and a rear group which form a widest air space in the optical axis therebetween in the fourth lens group, and the at least one positive lens having the optical material is arranged at least in the fourth lens group.

6. The zoom lens of claim 1, wherein, a conditional expression (4) is satisfied:

$$\Phi B/\Phi A > 0.4 \quad (4),$$

wherein $\Phi A$ represents a power of the first or fourth lens group including the at least one positive lens having the optical material, and $\Phi B$ represents a total sum of the power of the at least one positive lens having the optical material in accordance with the first or fourth lens group.

7. The zoom lens of claim 6, wherein, when $\Phi A$ represents the power of the first lens group including the at least one positive lens having the optical material and the first lens group has front and rear groups, the first lens group is the power of the entire front and rear groups of the first lens group.

8. The zoom lens of claim 6, wherein, when $\Phi B$ represents the power of the fourth lens group including the at least one positive lens having the optical material and the fourth lens group has front and rear groups, the fourth lens group is the power of either the front or rear group.

9. An imaging apparatus, comprising:
a zoom lens according to claim 1; and
an imaging device which outputs an imaging signal in correspondence to an optical image formed using the zoom lens.

* * * * *